US012657097B2

(12) United States Patent
Rayaraddi et al.

(10) Patent No.: US 12,657,097 B2
(45) **Date of Patent: *Jun. 16, 2026**

(54) SYSTEM AND METHOD FOR AVAILABILITY GROUP DATABASE PATCHING

(71) Applicant: Nutanix, Inc., San Jose, CA (US)

(72) Inventors: Rohan Mohan Rayaraddi, Bangalore (IN); Tarun Mehta, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,690

(22) Filed: Jan. 3, 2024

(65) Prior Publication Data

US 2024/0134762 A1 Apr. 25, 2024

Related U.S. Application Data

(63) Continuation of application No. 17/694,964, filed on Mar. 15, 2022, now Pat. No. 11,892,918.

(Continued)

(51) Int. Cl.
*G06F 11/20* (2006.01)
*G06F 8/65* (2018.01)
(Continued)

(52) U.S. Cl.
CPC ............ *G06F 11/2025* (2013.01); *G06F 8/65* (2013.01); *G06F 9/5038* (2013.01);
(Continued)

(58) Field of Classification Search
CPC ...... G06F 11/2025; G06F 8/65; G06F 9/5038; G06F 11/0793; G06F 11/1433;
(Continued)

(56) References Cited

U.S. PATENT DOCUMENTS 4,742,482 A 5/1988 Inskeep et al.
5,594,859 A 1/1997 Palmer et al.
(Continued)

FOREIGN PATENT DOCUMENTS

CN 104408071 A 3/2015
CN 105446828 A 3/2016
(Continued)

OTHER PUBLICATIONS

High availability software—Wikipedia (Year: 2016).*
(Continued)

*Primary Examiner* — Marc Duncan
*Assistant Examiner* — Michael Xu
(74) *Attorney, Agent, or Firm* — Foley & Lardner LLP

(57) ABSTRACT

A patching operation on an availability group cluster having a plurality of nodes is disclosed. The patching operation is performed in a plurality of iterations, each including determining a current state of each of the plurality of nodes, selecting a next node based on the current state, and patching the next node. A secondary replica node is selected as the next node before the a primary replica node. Each secondary replica node is patched in accordance with a first priority, upon patching each of the secondary replica node, a failover target node for patching the primary replica node is selected, the failover target node is selected based on a second priority, and according to the second priority, a healthy synchronous secondary replica node of the plurality of nodes is selected as the failover target node before an unhealthy synchronous secondary replica node of the plurality of nodes.

43 Claims, 11 Drawing Sheets

Related U.S. Application Data

(60) Provisional application No. 63/164,315, filed on Mar. 22, 2021.

(51) Int. Cl.

| | |
|---|---|
| *G06F 9/50* | (2006.01) |
| *G06F 11/07* | (2006.01) |
| *G06F 11/14* | (2006.01) |
| *G06F 11/1446* | (2026.01) |

(52) U.S. Cl.
CPC ...... *G06F 11/0793* (2013.01); *G06F 11/1433* (2013.01); *G06F 11/1464* (2013.01); *G06F 11/2069* (2013.01); *G06F 11/2094* (2013.01); *G06F 2201/80* (2013.01)

(58) Field of Classification Search
CPC ............. G06F 11/1464; G06F 11/2069; G06F 11/2094; G06F 2201/80
See application file for complete search history.

(56) References Cited

U.S. PATENT DOCUMENTS

| | | | |
|---|---|---|---|
| 6,064,975 | A | 5/2000 | Moon et al. |
| 6,243,715 | B1 | 6/2001 | Bogantz et al. |
| 6,542,893 | B1 | 4/2003 | Quernemoen |
| 6,766,477 | B2 | 7/2004 | Grucci et al. |
| D508,248 | S | 8/2005 | Ording |
| D521,521 | S | 5/2006 | Jewitt et al. |
| 7,046,134 | B2 | 5/2006 | Hansen |
| 7,136,865 | B1 | 11/2006 | Ra et al. |
| 7,225,189 | B1 | 5/2007 | McCormack et al. |
| 7,331,000 | B2 | 2/2008 | Ohno et al. |
| 7,389,300 | B1 | 6/2008 | Shah et al. |
| 7,634,679 | B2 | 12/2009 | Quintiliano |
| 7,725,671 | B2 | 5/2010 | Prahlad et al. |
| D625,315 | S | 10/2010 | Jewitt et al. |
| 7,814,057 | B2 | 10/2010 | Kathuria et al. |
| 7,840,533 | B2 | 11/2010 | Prahlad et al. |
| 7,873,610 | B2 | 1/2011 | Poulsen |
| 7,873,684 | B2 | 1/2011 | Souder et al. |
| 7,941,470 | B2 | 5/2011 | Le et al. |
| 7,953,764 | B2 | 5/2011 | Baffier et al. |
| 7,971,094 | B1 | 6/2011 | Benn et al. |
| 7,974,942 | B2 | 7/2011 | Pomroy et al. |
| 8,117,165 | B1 | 2/2012 | Winckelmann et al. |
| 8,146,080 | B2 | 3/2012 | Carter et al. |
| D656,948 | S | 4/2012 | Kundsen et al. |
| 8,150,808 | B2 | 4/2012 | Zha et al. |
| 8,250,033 | B1 | 8/2012 | De Souter et al. |
| 8,291,409 | B2 | 10/2012 | Winner et al. |
| 8,335,765 | B2 | 12/2012 | Sivasubramanian et al. |
| 8,364,648 | B1 | 1/2013 | Sim-Tang |
| 8,429,630 | B2 | 4/2013 | Nickolov et al. |
| 8,447,728 | B2 | 5/2013 | Prahlad et al. |
| 8,448,170 | B2 | 5/2013 | Wipfel et al. |
| D684,160 | S | 6/2013 | Truelove et al. |
| D684,161 | S | 6/2013 | Truelove et al. |
| 8,468,174 | B1 | 6/2013 | Yueh et al. |
| 8,549,518 | B1 | 10/2013 | Aron et al. |
| 8,572,031 | B2 | 10/2013 | Merriman et al. |
| 8,601,473 | B1 | 12/2013 | Aron et al. |
| 8,612,396 | B1 | 12/2013 | Mcalister et al. |
| 8,635,421 | B2 | 1/2014 | Gupta et al. |
| 8,656,123 | B2 | 2/2014 | Lee |
| 8,656,303 | B2 | 2/2014 | Hughes |
| 8,677,085 | B2 | 3/2014 | Vaghani et al. |
| 8,713,060 | B2 | 4/2014 | Sivasubramanian et al. |
| 8,762,335 | B2 | 6/2014 | Prahlad et al. |
| 8,769,537 | B1 | 7/2014 | Ruggiero et al. |
| 8,775,438 | B1 | 7/2014 | Brooker et al. |
| 8,832,028 | B2 | 9/2014 | Susairaj et al. |
| 8,843,441 | B1 | 9/2014 | Rath et al. |
| 8,849,850 | B2 | 9/2014 | Baffier et al. |

| | | | |
|---|---|---|---|
| 8,850,130 | B1 | 9/2014 | Aron et al. |
| 8,856,189 | B1 | 10/2014 | Bull et al. |
| 8,863,124 | B1 | 10/2014 | Aron |
| 8,874,749 | B1 | 10/2014 | Vittal et al. |
| 8,914,567 | B2 | 12/2014 | Miroshnichenko et al. |
| 8,924,974 | B1 | 12/2014 | Ruggiero et al. |
| 8,972,347 | B1 | 3/2015 | Sim-Tang |
| 9,009,106 | B1 | 4/2015 | Aron et al. |
| 9,069,708 | B2 | 6/2015 | Gill et al. |
| D733,745 | S | 7/2015 | Huang |
| 9,116,737 | B2 | 8/2015 | Aswathanarayana et al. |
| 9,116,803 | B1 | 8/2015 | Agrawal et al. |
| 9,116,862 | B1 | 8/2015 | Rath et al. |
| 9,213,727 | B1 | 12/2015 | Esposito |
| 9,244,717 | B2 | 1/2016 | Pissay et al. |
| D749,117 | S | 2/2016 | Huang |
| 9,256,383 | B2 | 2/2016 | De Spiegeleer et al. |
| 9,268,610 | B2 | 2/2016 | Hegdal et al. |
| 9,270,521 | B2 | 2/2016 | Tompkins |
| D753,135 | S | 4/2016 | Vazquez |
| D753,140 | S | 4/2016 | Kouvas et al. |
| 9,305,068 | B1 | 4/2016 | Esposito |
| 9,311,330 | B1 | 4/2016 | Chockalingam et al. |
| 9,336,060 | B2 | 5/2016 | Nori et al. |
| 9,336,132 | B1 | 5/2016 | Aron et al. |
| 9,372,758 | B2 | 6/2016 | Ashutosh et al. |
| D761,288 | S | 7/2016 | Cianflone et al. |
| 9,384,254 | B2 | 7/2016 | Tekade et al. |
| 9,389,962 | B1 | 7/2016 | Yueh et al. |
| D763,890 | S | 8/2016 | Pan |
| 9,405,634 | B1 | 8/2016 | Ambastha et al. |
| 9,413,810 | B2 | 8/2016 | Rezvani et al. |
| 9,436,556 | B2 | 9/2016 | Siden et al. |
| D771,102 | S | 11/2016 | Protzman et al. |
| 9,495,435 | B2 | 11/2016 | Zhang et al. |
| 9,507,579 | B2 | 11/2016 | Gambardella et al. |
| 9,529,551 | B2 | 12/2016 | Kesavan et al. |
| 9,529,808 | B1 | 12/2016 | Sudarsanam et al. |
| D777,747 | S | 1/2017 | Derby et al. |
| D778,296 | S | 2/2017 | Belkin et al. |
| D779,514 | S | 2/2017 | Baris et al. |
| 9,582,297 | B2 | 2/2017 | Jin et al. |
| D781,887 | S | 3/2017 | Dziuba et al. |
| 9,600,193 | B2 | 3/2017 | Ahrens et al. |
| 9,621,680 | B2 | 4/2017 | D'Costa et al. |
| 9,639,429 | B2 | 5/2017 | Stewart et al. |
| 9,652,265 | B1 | 5/2017 | Narayanasamy et al. |
| 9,659,080 | B1 | 5/2017 | Drobychev et al. |
| 9,665,437 | B2 | 5/2017 | Bhargava et al. |
| D794,666 | S | 8/2017 | Havaldar et al. |
| D794,667 | S | 8/2017 | Havaldar et al. |
| 9,733,958 | B2 * | 8/2017 | Cui ........................... G06F 9/50 |
| 9,740,472 | B1 * | 8/2017 | Sohi ..................... G06F 15/173 |
| 9,740,723 | B2 | 8/2017 | Prahlad et al. |
| 9,747,287 | B1 | 8/2017 | Bhardwaj et al. |
| D797,116 | S | 9/2017 | Chapman et al. |
| 9,753,713 | B2 | 9/2017 | Mani et al. |
| 9,760,396 | B2 | 9/2017 | Apte et al. |
| 9,772,866 | B1 | 9/2017 | Aron et al. |
| 9,778,992 | B1 | 10/2017 | Yueh et al. |
| D802,608 | S | 11/2017 | Hicks et al. |
| D803,231 | S | 11/2017 | Guinness et al. |
| 9,830,082 | B1 | 11/2017 | Srinivasan et al. |
| D807,902 | S | 1/2018 | Cong et al. |
| 9,858,155 | B2 | 1/2018 | Ashutosh et al. |
| 9,881,168 | B2 | 1/2018 | Chari et al. |
| D809,530 | S | 2/2018 | Matheson et al. |
| D815,652 | S | 4/2018 | Protzman et al. |
| 9,934,107 | B1 | 4/2018 | Chikkanayakanahally et al. |
| D817,976 | S | 5/2018 | Shilwant et al. |
| 9,960,963 | B2 * | 5/2018 | Selvaraj ............. H04L 41/0846 |
| 10,013,313 | B2 | 7/2018 | Zhang et al. |
| 10,033,833 | B2 | 7/2018 | Fu et al. |
| 10,055,300 | B2 | 8/2018 | Zhang et al. |
| 10,057,279 | B1 | 8/2018 | Balduzzi et al. |
| 10,061,852 | B1 | 8/2018 | Plenderleith |
| 10,078,465 | B1 | 9/2018 | Wu et al. |
| 10,108,496 | B2 | 10/2018 | Hoobler et al. |
| 10,108,685 | B2 | 10/2018 | Amdur et al. |

(56) References Cited

U.S. PATENT DOCUMENTS

| | | | |
|---|---|---|---|
| 10,146,848 B2 | 12/2018 | Narayanan et al. |
| D838,288 S | 1/2019 | Sunshine et al. |
| 10,185,627 B2 | 1/2019 | Wong et al. |
| D839,913 S | 2/2019 | Chen et al. |
| 10,206,092 B1 | 2/2019 | Mellquist et al. |
| 10,210,048 B2 | 2/2019 | Sancheti |
| 10,212,195 B2 | 2/2019 | Maskalik et al. |
| D843,388 S | 3/2019 | Protzman et al. |
| 10,235,250 B1 | 3/2019 | Ambastha et al. |
| 10,248,657 B2 | 4/2019 | Prahlad et al. |
| 10,261,867 B1 | 4/2019 | Terry et al. |
| 10,268,551 B1 | 4/2019 | Wong |
| 10,275,267 B1 | 4/2019 | De Kadt et al. |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,957 B2 | 8/2019 | Ngo |
| 10,379,963 B2 | 8/2019 | Bhargava et al. |
| D862,512 S | 10/2019 | Schubart |
| 10,445,298 B2 | 10/2019 | Ramu et al. |
| 10,447,806 B1 | 10/2019 | Sahay et al. |
| 10,476,955 B2 | 11/2019 | Mutalik et al. |
| D870,762 S | 12/2019 | Mendoza Corominas et al. |
| 10,496,302 B1 | 12/2019 | Gaurav et al. |
| 10,503,612 B1 | 12/2019 | Wang et al. |
| 10,509,798 B2 | 12/2019 | Chow et al. |
| D875,108 S | 2/2020 | Chitalia et al. |
| 10,572,292 B2 | 2/2020 | Bhandari et al. |
| D877,753 S | 3/2020 | Chitalia et al. |
| 10,579,364 B2 | 3/2020 | Doshi et al. |
| 10,599,423 B2 | 3/2020 | Coleman et al. |
| 10,606,578 B2 | 3/2020 | Kruglikov et al. |
| 10,613,938 B2 | 4/2020 | Blumenau et al. |
| 10,637,914 B2 | 4/2020 | Basavaiah et al. |
| 10,700,991 B2 | 6/2020 | Khinvasara et al. |
| 10,705,755 B2 | 7/2020 | Wang et al. |
| 10,719,407 B1 | 7/2020 | Chockalingam et al. |
| 10,725,866 B1 | 7/2020 | Palaiah et al. |
| 10,728,255 B2 | 7/2020 | Jindal et al. |
| 10,757,036 B2 | 8/2020 | Tung et al. |
| 10,776,329 B2 | 9/2020 | Ramohalli Gopala Rao et al. |
| 10,778,750 B2 | 9/2020 | Ringdahl |
| 10,785,029 B2 | 9/2020 | Gupta et al. |
| 10,785,255 B1 | 9/2020 | Otvagin et al. |
| 10,812,582 B2 | 10/2020 | Spillane et al. |
| 10,817,157 B2 | 10/2020 | Kuchibhotla et al. |
| 10,824,522 B2 | 11/2020 | Sadavarte et al. |
| 10,824,956 B1 | 11/2020 | Natanzon et al. |
| 10,855,554 B2 | 12/2020 | Freeman et al. |
| D911,356 S | 2/2021 | Varghese et al. |
| 10,922,957 B2 | 2/2021 | Rhoads et al. |
| 10,938,924 B1 | 3/2021 | Jensen et al. |
| 10,951,496 B2 | 3/2021 | Baker et al. |
| 10,959,098 B2 | 3/2021 | Cidon et al. |
| 10,965,737 B1 | 3/2021 | Parulkar et al. |
| 10,984,041 B2 | 4/2021 | Bedadala et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| 11,036,696 B2 | 6/2021 | Higginson et al. |
| D926,200 S | 7/2021 | Murphy et al. |
| 11,055,352 B1 | 7/2021 | Beitchman et al. |
| 11,061,709 B2 | 7/2021 | Cao et al. |
| D927,507 S | 8/2021 | Norman |
| 11,099,956 B1 | 8/2021 | Polimera et al. |
| 11,100,020 B2 | 8/2021 | Shah et al. |
| 11,108,629 B1 | 8/2021 | Cahyadi et al. |
| 11,120,011 B2 | 9/2021 | Priebe et al. |
| 11,126,426 B2 | 9/2021 | Zhu et al. |
| 11,169,887 B2 | 11/2021 | Bajaj et al. |
| 11,182,372 B1 | 11/2021 | Jain et al. |
| 11,243,703 B2 | 2/2022 | Watkins |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 * | 3/2022 | Javadekar ............... G06F 9/455 |
| 11,308,114 B1 | 4/2022 | Moghe |
| 11,320,978 B2 | 5/2022 | Kuchibhotla et al. |
| 11,372,820 B1 | 6/2022 | Harjono et al. |
| 11,386,058 B2 | 7/2022 | Hung et al. |
| 11,561,864 B1 | 1/2023 | Brahmadesam et al. |
| 11,604,705 B2 | 3/2023 | Mehta et al. |
| 11,604,806 B2 | 3/2023 | Mankad et al. |
| 11,609,828 B2 | 3/2023 | Khandkar et al. |
| 11,640,340 B2 | 5/2023 | Sontakke et al. |
| 11,741,380 B2 | 8/2023 | Khawas et al. |
| 11,816,066 B2 | 11/2023 | Kuchibhotla et al. |
| 11,860,818 B2 | 1/2024 | Kuchibhotla et al. |
| 11,899,685 B1 | 2/2024 | Pandis et al. |
| 11,907,507 B2 | 2/2024 | Kibo |
| 12,010,227 B1 | 6/2024 | Chhabra et al. |
| 12,019,523 B2 | 6/2024 | Mehta et al. |
| 12,081,604 B1 | 9/2024 | Hinds et al. |
| 12,093,715 B2 | 9/2024 | Zhao et al. |
| 12,153,499 B2 | 11/2024 | Sontakke et al. |
| 12,321,244 B1 | 6/2025 | Rather et al. |
| 2001/0014867 A1 | 8/2001 | Conmy |
| 2002/0019920 A1 | 2/2002 | Reuter et al. |
| 2002/0038554 A1 | 4/2002 | Monk et al. |
| 2002/0073089 A1 | 6/2002 | Schwartz et al. |
| 2002/0082858 A1 | 6/2002 | Heddaya et al. |
| 2002/0104376 A1 | 8/2002 | Danyluk et al. |
| 2002/0174098 A1 | 11/2002 | Wu et al. |
| 2003/0046353 A1 | 3/2003 | Chung et al. |
| 2003/0147309 A1 | 8/2003 | Weisberg |
| 2004/0059878 A1 | 3/2004 | Madany |
| 2005/0027661 A1 | 2/2005 | Lober et al. |
| 2005/0149757 A1 | 7/2005 | Corbett et al. |
| 2006/0029096 A1 | 2/2006 | Babbar et al. |
| 2006/0107006 A1 | 5/2006 | Green et al. |
| 2006/0143412 A1 | 6/2006 | Armangau |
| 2006/0161444 A1 | 7/2006 | Lubrecht et al. |
| 2006/0161462 A1 | 7/2006 | Sharma |
| 2006/0161879 A1 | 7/2006 | Lubrecht et al. |
| 2006/0242189 A1 | 10/2006 | Leetaru et al. |
| 2006/0253472 A1 | 11/2006 | Wasserman et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0059894 A1 | 3/2008 | Cisler et al. |
| 2008/0126945 A1 | 5/2008 | Munkvold et al. |
| 2008/0239985 A1 | 10/2008 | Karve et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0161547 A1 | 6/2009 | Riddle et al. |
| 2009/0228669 A1 | 9/2009 | Slesarev et al. |
| 2009/0276771 A1 | 11/2009 | Nickolov et al. |
| 2009/0276833 A1 | 11/2009 | Paul et al. |
| 2009/0319582 A1 | 12/2009 | Simek et al. |
| 2010/0017801 A1 | 1/2010 | Kundapur |
| 2010/0023564 A1 | 1/2010 | Yerneni et al. |
| 2010/0198791 A1 | 8/2010 | Wu et al. |
| 2010/0251242 A1 | 9/2010 | Sivasubramanian et al. |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0099420 A1 | 4/2011 | Macdonald Mcalister et al. |
| 2011/0138383 A1 | 6/2011 | Le |
| 2011/0252420 A1 | 10/2011 | Tung et al. |
| 2012/0011378 A1 | 1/2012 | Dalton et al. |
| 2012/0084260 A1 | 4/2012 | Cherkauer et al. |

(56) References Cited

U.S. PATENT DOCUMENTS

| | | |
|---|---|---|
| 2012/0123999 A1 | 5/2012 | Ashutosh et al. |
| 2012/0271797 A1 | 10/2012 | Patil |
| 2012/0290714 A1 | 11/2012 | Cohen |
| 2013/0019015 A1 | 1/2013 | Devarakonda et al. |
| 2013/0031136 A1 | 1/2013 | Shah |
| 2013/0091285 A1 | 4/2013 | Devarakonda et al. |
| 2013/0110779 A1 | 5/2013 | Taylor et al. |
| 2013/0117441 A1 | 5/2013 | Kuchibhotla et al. |
| 2013/0232470 A1 | 9/2013 | Yung |
| 2013/0232497 A1 | 9/2013 | Jalagam et al. |
| 2013/0238331 A1 | 9/2013 | Mikan et al. |
| 2013/0263119 A1 | 10/2013 | Pissay et al. |
| 2013/0290180 A1 | 10/2013 | Baffier et al. |
| 2013/0332251 A1 | 12/2013 | Ioannidis et al. |
| 2014/0006350 A1 | 1/2014 | Fukui et al. |
| 2014/0018947 A1 | 1/2014 | Ales |
| 2014/0059226 A1 | 2/2014 | Messerli et al. |
| 2014/0101117 A1 | 4/2014 | Uzzaman |
| 2014/0108339 A1 | 4/2014 | Marsden |
| 2014/0189685 A1 | 7/2014 | Kripalani |
| 2014/0201171 A1 | 7/2014 | Vijayan et al. |
| 2014/0229504 A1 | 8/2014 | Kim et al. |
| 2014/0229698 A1 | 8/2014 | Sivasubramanian et al. |
| 2014/0250081 A1 | 9/2014 | Stewart et al. |
| 2014/0282256 A1 | 9/2014 | Fish et al. |
| 2014/0337844 A1 | 11/2014 | Jin et al. |
| 2014/0359058 A1 | 12/2014 | Karnawat et al. |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0127611 A1 | 5/2015 | Westerman et al. |
| 2015/0142610 A1 | 5/2015 | Manoharan et al. |
| 2015/0143064 A1 | 5/2015 | Bhargava et al. |
| 2015/0188775 A1 | 7/2015 | Van Der Walt |
| 2015/0188789 A1 | 7/2015 | Jayaprakash |
| 2015/0195347 A1 | 7/2015 | Luft |
| 2015/0207682 A1 | 7/2015 | Moraes Nichele et al. |
| 2015/0207683 A1 | 7/2015 | Adogla |
| 2015/0207703 A1 | 7/2015 | Gallagher et al. |
| 2015/0227435 A1 | 8/2015 | Ashutosh et al. |
| 2015/0227602 A1 | 8/2015 | Ramu et al. |
| 2015/0254141 A1 | 9/2015 | Wertheimer et al. |
| 2015/0301814 A1 | 10/2015 | Chen et al. |
| 2015/0331923 A1 | 11/2015 | Kim |
| 2015/0339941 A1 | 11/2015 | Lu |
| 2015/0347987 A1 | 12/2015 | Ali |
| 2015/0358417 A1 | 12/2015 | Patil et al. |
| 2015/0370641 A1 | 12/2015 | Susairaj et al. |
| 2016/0041997 A1 | 2/2016 | Gokhale et al. |
| 2016/0048408 A1 | 2/2016 | Madhu et al. |
| 2016/0057077 A1 | 2/2016 | Gomatam et al. |
| 2016/0066201 A1 | 3/2016 | Kerpez et al. |
| 2016/0077923 A1 | 3/2016 | Zhang et al. |
| 2016/0077925 A1 | 3/2016 | Tekade et al. |
| 2016/0078104 A1 | 3/2016 | Clifford et al. |
| 2016/0092535 A1 | 3/2016 | Kuchibhotla et al. |
| 2016/0094401 A1 | 3/2016 | Anwar et al. |
| 2016/0094410 A1 | 3/2016 | Anwar et al. |
| 2016/0094647 A1 | 3/2016 | Mordani et al. |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0182328 A1 | 6/2016 | Bhasin et al. |
| 2016/0188421 A1 | 6/2016 | Karinta et al. |
| 2016/0191348 A1 | 6/2016 | Lee et al. |
| 2016/0197835 A1 | 7/2016 | Luft |
| 2016/0224259 A1 | 8/2016 | Ahrens et al. |
| 2016/0239637 A1 | 8/2016 | Miller et al. |
| 2016/0246503 A1 | 8/2016 | Phelan et al. |
| 2016/0248629 A1 | 8/2016 | Erdmann et al. |
| 2016/0266913 A1 | 9/2016 | Achillopoulos |
| 2016/0267105 A1 | 9/2016 | Sun et al. |
| 2016/0274981 A1 | 9/2016 | Wilkinson |
| 2016/0292358 A1 | 10/2016 | Heger |
| 2016/0306840 A1 | 10/2016 | Deshmukh et al. |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0344582 A1 | 11/2016 | Shivanna et al. |
| 2016/0378361 A1 | 12/2016 | Uriel |
| 2016/0378622 A1 | 12/2016 | Ren et al. |
| 2016/0380809 A1 | 12/2016 | Hou et al. |
| 2017/0031775 A1 | 2/2017 | Arumugham et al. |
| 2017/0039236 A1 | 2/2017 | Li et al. |
| 2017/0060699 A1 | 3/2017 | Hohl et al. |
| 2017/0068469 A1 | 3/2017 | Shankar et al. |
| 2017/0091231 A1 | 3/2017 | Difranco et al. |
| 2017/0115978 A1* | 4/2017 | Modi ........................ G06F 8/65 |
| 2017/0199753 A1 | 7/2017 | Gong |
| 2017/0220777 A1 | 8/2017 | Wang et al. |
| 2017/0228227 A1 | 8/2017 | Winterfeldt et al. |
| 2017/0235563 A1* | 8/2017 | Bafna ................. G06F 16/1844 |
| | | 718/1 |
| 2017/0235758 A1 | 8/2017 | Gopalapura Venkatesh et al. |
| 2017/0235950 A1 | 8/2017 | Gopalapura Venkatesh et al. |
| 2017/0243275 A1 | 8/2017 | Goens et al. |
| 2017/0262232 A1 | 9/2017 | Zhao et al. |
| 2017/0264684 A1 | 9/2017 | Spillane et al. |
| 2017/0272359 A1 | 9/2017 | Behringer et al. |
| 2017/0286517 A1 | 10/2017 | Horowitz et al. |
| 2017/0286518 A1 | 10/2017 | Horowitz et al. |
| 2017/0315877 A1 | 11/2017 | Kaplingat et al. |
| 2017/0322827 A1 | 11/2017 | Little et al. |
| 2017/0344618 A1 | 11/2017 | Horowitz et al. |
| 2017/0351584 A1 | 12/2017 | Griffith et al. |
| 2017/0351716 A1 | 12/2017 | Higginson et al. |
| 2017/0357667 A1 | 12/2017 | Auch et al. |
| 2017/0371547 A1 | 12/2017 | Fruchtman et al. |
| 2017/0374136 A1 | 12/2017 | Ringdahl |
| 2018/0025007 A1 | 1/2018 | Dai |
| 2018/0060119 A1 | 3/2018 | Zamir |
| 2018/0063088 A1 | 3/2018 | Hardy |
| 2018/0113622 A1 | 4/2018 | Sancheti |
| 2018/0121239 A1 | 5/2018 | Sawhney et al. |
| 2018/0121494 A1 | 5/2018 | Antonopoulos et al. |
| 2018/0121521 A1 | 5/2018 | Bivol |
| 2018/0157561 A1 | 6/2018 | Venkatesh et al. |
| 2018/0173452 A1 | 6/2018 | Hu et al. |
| 2018/0181469 A1 | 6/2018 | Yueh et al. |
| 2018/0203771 A1 | 7/2018 | Heidel et al. |
| 2018/0232142 A1 | 8/2018 | Shekar et al. |
| 2018/0253676 A1 | 9/2018 | Sheth et al. |
| 2018/0270219 A1 | 9/2018 | Li |
| 2018/0275881 A1 | 9/2018 | Ashraf et al. |
| 2018/0285201 A1 | 10/2018 | Bangalore et al. |
| 2018/0285353 A1 | 10/2018 | Ramohalli Gopala Rao et al. |
| 2018/0293397 A1 | 10/2018 | Demember et al. |
| 2018/0300203 A1 | 10/2018 | Kathpal et al. |
| 2018/0307728 A1 | 10/2018 | Crupi et al. |
| 2018/0324279 A1 | 11/2018 | Barton et al. |
| 2019/0005407 A1 | 1/2019 | Harris et al. |
| 2019/0018738 A1 | 1/2019 | Chen |
| 2019/0034240 A1* | 1/2019 | Nabi ................. G06F 9/45558 |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0116237 A1 | 4/2019 | Gibson |
| 2019/0121671 A1 | 4/2019 | Guim Bernat |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0179711 A1 | 6/2019 | Luo et al. |
| 2019/0182213 A1 | 6/2019 | Saavedra et al. |
| 2019/0230156 A1 | 7/2019 | Mclarty et al. |
| 2019/0235904 A1 | 8/2019 | Epping et al. |
| 2019/0238412 A1 | 8/2019 | Vohra et al. |

(56) References Cited

U.S. PATENT DOCUMENTS

| | | | |
|---|---|---|---|
| 2019/0238520 A1 | 8/2019 | Espinosa et al. | |
| 2019/0245704 A1 | 8/2019 | Pala | |
| 2019/0266268 A1 | 8/2019 | Polinati | |
| 2019/0310926 A1* | 10/2019 | Hashimoto | G06F 11/2041 |
| 2019/0324865 A1 | 10/2019 | Weissman et al. | |
| 2019/0332582 A1 | 10/2019 | Kumar et al. | |
| 2019/0339870 A1 | 11/2019 | Meiri et al. | |
| 2019/0340091 A1 | 11/2019 | Chandrasekaran et al. | |
| 2019/0349194 A1 | 11/2019 | Fan | |
| 2019/0361412 A1 | 11/2019 | Park et al. | |
| 2019/0361748 A1 | 11/2019 | Walters et al. | |
| 2019/0362004 A1 | 11/2019 | Oks et al. | |
| 2019/0370146 A1 | 12/2019 | Babu et al. | |
| 2019/0384496 A1 | 12/2019 | Abdul Rasheed et al. | |
| 2019/0391880 A1 | 12/2019 | Wang et al. | |
| 2019/0394093 A1 | 12/2019 | Kulkarni et al. | |
| 2020/0028932 A1 | 1/2020 | Yang et al. | |
| 2020/0034178 A1 | 1/2020 | Gupta et al. | |
| 2020/0034245 A1 | 1/2020 | Kohler | |
| 2020/0042293 A1 | 2/2020 | Elango et al. | |
| 2020/0050522 A1 | 2/2020 | Coleman et al. | |
| 2020/0059411 A1 | 2/2020 | Olmsted-Thompson et al. | |
| 2020/0081704 A1* | 3/2020 | Bafna | G06F 3/0647 |
| 2020/0097177 A1 | 3/2020 | Ashokkumar et al. | |
| 2020/0097325 A1 | 3/2020 | Vadapandeshwara et al. | |
| 2020/0099692 A1 | 3/2020 | Jindal et al. | |
| 2020/0104375 A1 | 4/2020 | Earnesty et al. | |
| 2020/0104376 A1 | 4/2020 | Earnesty et al. | |
| 2020/0104377 A1 | 4/2020 | Earnesty et al. | |
| 2020/0106737 A1 | 4/2020 | Beedu et al. | |
| 2020/0110675 A1 | 4/2020 | Wang et al. | |
| 2020/0137157 A1 | 4/2020 | Joseph et al. | |
| 2020/0153898 A1* | 5/2020 | Sabath | G06F 9/4856 |
| 2020/0162380 A1 | 5/2020 | Pilkington et al. | |
| 2020/0193388 A1 | 6/2020 | Tran-Kiem et al. | |
| 2020/0201526 A1 | 6/2020 | Kuchibhotla et al. | |
| 2020/0210378 A1 | 7/2020 | Kuchibhotla et al. | |
| 2020/0210379 A1 | 7/2020 | Kuchibhotla et al. | |
| 2020/0250046 A1 | 8/2020 | Wong et al. | |
| 2020/0250059 A1 | 8/2020 | Bothello et al. | |
| 2020/0285608 A1 | 9/2020 | Chakankar et al. | |
| 2020/0285652 A1 | 9/2020 | Wang et al. | |
| 2020/0314173 A1 | 10/2020 | Pahwa et al. | |
| 2020/0349018 A1 | 11/2020 | Meadowcroft et al. | |
| 2020/0351332 A1 | 11/2020 | Palladino et al. | |
| 2020/0366661 A1 | 11/2020 | Mehta et al. | |
| 2020/0379793 A1 | 12/2020 | Parihar et al. | |
| 2021/0005330 A1 | 1/2021 | Patil et al. | |
| 2021/0051530 A1 | 2/2021 | Venkataraman et al. | |
| 2021/0064512 A1 | 3/2021 | Sirov et al. | |
| 2021/0064591 A1 | 3/2021 | Sun et al. | |
| 2021/0075700 A1 | 3/2021 | Palladino et al. | |
| 2021/0117293 A1 | 4/2021 | Luo et al. | |
| 2021/0133031 A1 | 5/2021 | Moldvai et al. | |
| 2021/0135983 A1 | 5/2021 | Farnham | |
| 2021/0141921 A1 | 5/2021 | Toplak | |
| 2021/0141923 A1 | 5/2021 | Wu et al. | |
| 2021/0144060 A1 | 5/2021 | Cencini et al. | |
| 2021/0194825 A1 | 6/2021 | Goodman et al. | |
| 2021/0200643 A1 | 7/2021 | Luo et al. | |
| 2021/0281428 A1 | 9/2021 | Kempf et al. | |
| 2021/0328979 A1 | 10/2021 | M | |
| 2021/0391999 A1 | 12/2021 | Chilamakuri et al. | |
| 2021/0400533 A1 | 12/2021 | Kwok | |
| 2021/0406132 A1 | 12/2021 | Gupta et al. | |
| 2021/0406717 A1 | 12/2021 | Tauheed et al. | |
| 2022/0004469 A1 | 1/2022 | Shen et al. | |
| 2022/0050753 A1 | 2/2022 | Mehta et al. | |
| 2022/0066993 A1 | 3/2022 | Khanuja et al. | |
| 2022/0116445 A1 | 4/2022 | Filippou et al. | |
| 2022/0311681 A1 | 9/2022 | Palladino et al. | |
| 2022/0351169 A1 | 11/2022 | Kim et al. | |
| 2022/0417205 A1 | 12/2022 | Nainar et al. | |
| 2023/0065444 A1 | 3/2023 | Pyla et al. | |
| 2023/0095814 A1 | 3/2023 | Sarkar | |
| 2023/0096071 A1 | 3/2023 | Sarkar | |
| 2023/0108625 A1 | 4/2023 | Yi et al. | |
| 2023/0115093 A1 | 4/2023 | Zhou | |
| 2023/0125754 A1 | 4/2023 | Willett et al. | |
| 2023/0164567 A1 | 5/2023 | Fellows et al. | |
| 2023/0185823 A1 | 6/2023 | Chu et al. | |
| 2023/0195529 A1 | 6/2023 | Luthra et al. | |
| 2023/0214305 A1 | 7/2023 | Hockey et al. | |
| 2023/0216736 A1 | 7/2023 | Almadani et al. | |
| 2023/0231912 A1 | 7/2023 | Vohra et al. | |
| 2023/0247087 A1 | 8/2023 | Nagaraja et al. | |
| 2023/0251938 A1 | 8/2023 | Sontakke et al. | |
| 2023/0344885 A1 | 10/2023 | Arnold et al. | |
| 2023/0379699 A1 | 11/2023 | Oerton et al. | |
| 2023/0418639 A1 | 12/2023 | Vaishnav et al. | |
| 2024/0045585 A1 | 2/2024 | Kuchibhotla et al. | |
| 2024/0045834 A1 | 2/2024 | Kuchibhotla et al. | |
| 2024/0126777 A1 | 4/2024 | Tylik et al. | |
| 2024/0134824 A1 | 4/2024 | Khanuja et al. | |
| 2024/0161006 A1* | 5/2024 | Dey | G06N 20/00 |

FOREIGN PATENT DOCUMENTS

| | | | |
|---|---|---|---|
| CN | 108664660 A | 10/2018 | |
| CN | 113010599 A | 6/2021 | |
| EP | 1 654 683 B1 | 5/2006 | |
| EP | 2 980 707 A1 | 2/2016 | |
| GB | 2 451 943 A | 2/2009 | |
| LU | 102236 B1 | 11/2020 | |
| TW | 201600970 A1 | 1/2016 | |
| WO | WO-2010/106578 | 9/2010 | |
| WO | WO-2016/069029 A1 | 5/2016 | |
| WO | WO-2020/026476 A1 | 2/2020 | |
| WO | WO-2020/072338 A1 | 4/2020 | |
| WO | WO-2021/108075 A1 | 6/2021 | |

OTHER PUBLICATIONS

"Recommended Practice for Patch Management of Control Systems", Steven Tom, Idaho National Laboratory, Dec. 2008, Cybersecurity Infrastructure Security Agency (CISA), U.S. Department of Homeland Security (Year: 2008).*
Affidavit of Nathaniel E Frank-White, Aug. 10, 2024.
Expedia, Preferred Class Drop Down, www.expedia.com/.
Foreign Action other than Search Report on PCT Dtd Jan. 2, 2025.
McGraw-Hill Dictionary of Scientific and Technical Terms, recoil milking—recovery system, pp. 4, 6th edition.
MySQL, "Supported Platforms: MySQL Database", https://web.archive.org/web/20181106221826/https://www.mysql.com/support/supportedplatforms/database.html.
New Oxford American Dictionary, Third Edition, "authorized—avail", 4 pages, 2010.
*Nutanix* v. *Tessell*, "Civil Docket for Case 3:24-cv-01729-AMO".
*Nutanix* v. *Tessell*, "Order Setting initial Case Management Conference and ADR Deadlines", Northern District of California, Mar. 20, 2024.
*Tessell* v. *Nutanix* IPR Power of Attorney.
*Tessell* v. *Nutanix*, IPR2025-00322, Dec. 18, 2024, pp. 7.
Google, Creating Instances, Cloud SQL for MySQL, pp. 1-5.
Taking a Backup Using Snapshots, LVM Howto, Chapter 13 Recipes.
"Creating Instances," Google Cloud ("Google") (Wayback Machine Capture, Sep. 18, 2018), available at https://www.archive.org/web/20180918103721/https://cloud.google.com/sql/docs/mysql/create-instance.
“Nutanix Era: Databases Made Simple, ” as archived by the Internet Archive on Sep. 26, 2020, available at http://web.archive.org/web/20200926222827/https://www.nutanix.com/blog/nutanix-era-databases-made-simple (1 of 3).
“Taking a Backup Using Snapshots” (“LVM-Howto”) (Wayback Machine Capture, Jan. 20, 2007), available at https://web.archive.org/web/20070120200004/https://tidp.org/HOWTO/LVM-HOWTO/snapshots backup.html (2 of 3).

(56) References Cited

OTHER PUBLICATIONS

“Windows Geo-Clustering: SQL Server, ” published Oct. 12, 2014 (3 of 3).

7 more ways to Query Always on Availability Groups, as archived by the Internet Archive on Mar. 30, 2019, available at https://web.archive.org/web/20190330182441/https://sqlundercover.com/2019/02/19/7-more-ways-to-query-always-on-availability-groups/.

Amazon Relational Database Service User Guide (2016) (“RDS ”) (Wayback Machine Capture, Apr. 12, 2016), available at https://web.archive.org/web/20160412105355/http://docs.aws.amazon.com/AmazonRDS/latest/UserGuide/rds-ug.pdf.

Federal Court Management Statistics–Profiles, U.S. District Courts𠄼ombined Civil and Criminal (Dec. 2024).

Order Granting Defendant’s Motion to Compel Arbitration (staying the remaining claims) in *Nutanix, Inc.* v. *Tessell, Inc.*, Case No. 3:24-cv-01729 (N.D. Cal. Mar. 20, 2024).

SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.

The American Heritage Dictionary of the English Language (5th ed. 2011) ("Heritage").

Use the Availability Group Wizard (SQL Server Management Studio), as archived by the Interne Archive on Jan. 20, 2020, available at https://web.archive.org/web/20200120100053/https://docs.microsoft.com/en-us/sql/database-engine/availability-groups/windows/use-the-availability-group-wizard-sql-server-management-studio?view=sql-server-ver15.

Using Oracle Database Cloud Service – Creating a Database Deployment (2017) (“Oracle”) (Wayback Machine Capture, Jan. 18, 2017), available at https://web.archive.org/web/20170118071307/https://docs.oracle.com/en/cloud/paas/database-dbaascloud/csdbi/create-db-deployment.html.

"Amazon RDS Now Supports Setting Up Connectivity Between Your RDS Database and EC2 Compute Instance in 1-Click", Amazon Web Services, Oct. 23, 2009. https://aws.amazon.com/rds.

"Azure Arc extends the Azure control plane", May 17, 2022. https://infohub.delltechnologies.com/l/techbook-dell-emc-integrated-system-for-microsoft-azure-stack-hci-2/azure-arc-extends-the-azure-control-plane-14.

"Configure cross-tenant access settings for B2B collaboration", Azure AD, Microsoft Entra, May 24, 2022, 21pp.

"Connected Machine Agent Prerequisites", Sep. 27, 2022, https://learn.microsoft.com/en-us/azure/azure-arc/servers/prerequisites.

"Control Plane", Jun. 23, 2022. https://docs.controlplane.com.

"Exadata Database Service onCloud@Customer Administrator's Guide", Feb. 4, 2022. https://docs.oracle.com/en/engineered-systems/exadata-cloud-at-customer/ecccm/ecc-network-requirements.html#GUID-F06BD75B-E971-48ED-8699-E1004D4B4AC1.

Features and Capabilities of Azure Arcenabled SQL Managed Instance:, Aug. 13, 2022, https://learn.microsoft.com/en-us/azure/azure-arc/data/managed-instance-features.

"Managing Cloud-Native Workloads with Anthos", Oct. 19, 2021. https://authors.packtpub.com/wp-content/uploads/2021/10/Chapter-8-Professional-Cloud-Architect-1.pdf.

"Oracle Exadata Cloud@Customer X9M", Version 1.17, 2022, https://www.oracle.com/dk/a/ocom/docs/engineered-systems/exadata/exacc-x9m-ds.pdf.

"Overview of Azure Connected Machine Agent", Sep. 4, 2022, https://learn.microsoft.com/en-us/azure/azure-arc/servers/agent-overview.

"Row-Level Security", Sep. 17, 2022, https://learn.microsoft.com/en-us/sql/relational-databases/security/row-level-security?view=sql-server-ver16.

"Use Azure Private Link to Securely Connect Servers to Azure Arc", Jul. 28, 2022, https://learn.microsoft.com/en-us/azure/azure-arc/servers/private-link-security.

Actifio Enablement Team, "https:/Awww.youtube.com/watch?v=7mCcJTXxFM3l", "Oracle Advanced Data Protection and Workflows", May 15, 2018 ) (Year: 2018).

Alhamazani, et al., "Cross-Layer Multi-Cloud Real-Time Application QoS Monitoring and Benchmarking As-a-Service Framework", Sep. 30, 2020. https://arxiv.org/ftp/arxiv/papers/1502/1502.00206.pdf.

Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).

Amazon Web Services, "Amazon RDS Now Supports Setting up Connectivity Between you RDS Database and EC2 Compute Instance in 1-Click", Aug. 22, 2022. https://aws.amazon.com/about-aws/whats-new/2022/08/amazon-rds-setting-up-connectivity-rds-database-ec2-compute-instance-1-click/.

Amazon Web Services, "Amazon RDS on Outposts", Mar. 22, 2022. https://aws.amazon.com/rds/outposts/?pg=In&sec=hiw.

Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.

Amazon Web Services, "SaaS Tenant Isolation Strategies. Isolating Resources in a Multi-Tenant Environment", (Aug. 2020).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

Anthos Technical Overview, Jun. 29, 2019. https://cloud.google.com/anthos/docs/concepts/overview.

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.

AWS Prescriptive Guidance, "PostgreSQL Pool Model", Jul. 1, 2022. https://docs.aws.amazon.com/prescriptive-guidance/latest/saas-multitenant-managed-postgresql/pool.html.

AWS Prescriptive Guidance, "Row-Level Security Recommendations", Jul. 1, 2022. https://docs.aws.amazon.com/prescriptive-guidance/latest/saas-multitenant-managed-postgresql/rls.html.

AWS Serverless SaaS Workshop—Lab4 : Isolating tenant data in a pooled model—Adding the missing code.

AWS Serverless SaaS Workshop—Lab4 : Isolating tenant data in a pooled model—Revisiting Authentication, Authorization, & Tenant Isolation.

AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).

AWS. "Amazon DocumentDB elastic clusters: how it works" Amazon DocumentDB. Jan. 2023. Retrieved from https://docs.aws.amazon.com/documentdb/latest/developerguide/elastic-how-it-works.html (accessed Apr. 6, 2023).

(56) References Cited

OTHER PUBLICATIONS

AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).

AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).

AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).

AWS. "Amazon Virtual Private Cloud" User Guide. Oct. 2022. Retrieved from https://docs.aws.amazon.com/pdfs/vpc/latest/userguide/vpc-ug.pdf#what-is-amazon-vpc (accessed Apr. 6, 2023).

AWS. "AWS glossary" AWS General Reference Guide. Jan. 2013. Retrieved from https://docs.aws.amazon.com/general/latest/gr/glos-chap.html (accessed Apr. 6, 2023).

AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).

AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).

AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).

AWS. "Create a DB instance" Amazon Relational Database Service. Jan. 2016. Retrieved from https://docs.aws.amazon.com/AmazonRDS/latest/UserGuide/CHAP_Tutorials.WebServerDB.Create DBInstance.html (accessed Jul. 26, 2023).

AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).

AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).

AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).

AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).

AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).

AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).

AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).

AWS. "Kubernetes on AWS" Amazon Web Services. Jun. 2018. Retrieved from https://aws.amazon.com/kubernetes/#:~:text=Kubernetes%20manages%20clusters%20of%20Amazon,premises%20and%20in%20the%20cloud (accessed Apr. 6, 2023).

AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).

AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).

AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).

AWS. "Rules" AWS CloudFormation. Feb. 9, 2021. Retrieved from https://docs.aws.amazon.com/AWSCloudFormation/latest/UserGuide/Welcome.html (accessed Sep. 6, 2023).

AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).

AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).

AWS. "User Guide for Linux Instances" Amazon Elastic Compute Cloud. Oct. 19, 2022. Retrieved from https://docs.aws.amazon.com/pdfs/AWSEC2/latest/UserGuide/ec2-ug.pdf#ebs-accessing-snapshot (accessed Apr. 6, 2023).

AWS. "What is an Instance in Cloud Computing?" Amazon Web Services. Sep. 17, 2022. Retrieved from https://aws.amazon.com/what-is/cloud-instances/#:~:text=You%20can%20run%20multiple%20virtual,of%20sharing%20and%20scaling%20resources (accessed Apr. 6, 2023).

AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).

AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).

AWS. "Working with read replicas for Microsoft SQL Server in Amazon RDS" Amazon Relational Database Service. Nov. 30, 2020. Retrieved from https://docs.aws.amazon.com/AmazonRDS/latest/UserGuide/SQLServer.ReadReplicas.html (accessed Apr. 25, 2023).

Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).

BackupAssist, "https://backupassist.com/support/en/backupassist/manage/calendar.htm", Jul. 1, 2017 (Year: 2017).

Bailey, Chris, et al. "IBM joins the Crossplane community" IBM Developer Blog. Dec. 15, 2020. Retrieved from https://developer.ibm.com/blogs/ibm-joins-the-crossplane-community/ (accessed Sep. 28, 2023).

Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Banthia, Bakul. "Can I share snapshots with specific users?" Tessell. 2023. Retrieved from https://help.tessell.com/en/articles/7118615-can-i-share-snapshots-with-specific-users (accessed Apr. 6, 2023).

Banthia, Bakul. "Do I need to enable snapshots for my database service or is it done automatically?" Tessell. 2023. Retrieved from https://help.tessell.com/en/articles/7118606-do-i-need-to-enable-snapshots-for-my-database-service-or-is-it-done-automatically (accessed Apr. 6, 2023).

Banthia, Bakul. "How can I perform cross-region snapshots and point-in-time-restore (PITR) for my disaster recovery needs?" Tessell. 2023. Retrieved from https://help.tessell.com/en/articles/6614103-how-can-i-perform-cross-region-snapshots-and-point-in-time-restore-pitr-for-my-disaster-recovery-needs (accessed Apr. 6, 2023).

Banthia, Bakul. "How do I provision a database service?" Tessell. 2023. Retrieved from https://help.tessell.com/en/articles/7118590-how-do-i-provision-a-database-service (accessed Apr. 6, 2023).

(56) References Cited

OTHER PUBLICATIONS

Banthia, Bakul. "How does billing work in Tessell?" Tessell. 2023. Retrieved from https://help.tessell.com/en/articles/6624926-how-does-billing-work-in-tessell (accessed Apr. 6, 2023).

Banthia, Bakul. "How does Tessell guarantee Zero Data Loss for Oracle?" Tessell. 2023. Retrieved from https://help.tessell.com/en/articles/7118627-how-does-tessell-guarantee-zero-data-loss-for-oracle (accessed Apr. 6, 2023).

Banthia, Bakul. "How does Tessell host Oracle databases on Azure?" Tessell. 2023. Retrieved from https://help.tessell.com/en/articles/7118621-how-does-tessell-host-oracle-databases-on-azure (accessed Apr. 6, 2023).

Banthia, Bakul. "Snapshots" Tessell. 2023. Retrieved from https://help.tessell.com/en/collections/3899147-snapshots (accessed Apr. 6, 2023).

Banthia, Bakul. "What are all the Apps in Tessell?" Tessell. 2023. Retrieved from https://help.tessell.com/en/articles/7118551-what-are-all-the-apps-in-tessell (accessed Apr. 6, 2023).

Banthia, Bakul. "What is an Availability Machine?" Tessell. 2023. Retrieved from https://help.tessell.com/en/articles/7118549-what-is-an-availability-machine (accessed Apr. 6, 2023).

Banthia, Bakul. "What is Tessell and how does it work?" Tessell. 2023. Retrieved from https://help.tessell.com/en/articles/7118534-what-is-tessell-and-how-does-it-work (accessed Apr. 6, 2023).

Banthia, Bakul. "What is Tessell's unified data management?" Tessell. Mar. 2023. Retrieved from https://help.tessell.com/en/articles/6624933-what-is-tessell-s-unified-data-management (accessed Apr. 6, 2023).

Banthia, Bakul. "What is the patch set composition of DB engine version for Oracle?" Tessell. 2023. Retrieved from https://help.tessell.com/en/articles/6614079-what-is-the-patch-set-composition-of-db-engine-version-for-oracle (accessed Apr. 6, 2023).

Banthia, Bakul. "Where are my automated snapshots stored and how do I manage their retention?" Tessell. 2023. Retrieved from https://help.tessell.com/en/articles/7118607-where-are-my-automated-snapshots-stored-and-how-do-i-manage-their-retention (accessed Apr. 6, 2023).

Banthia, Bakul. "Where are the databases hosted in Tessell?" Tessell. 2023. Retrieved from https://help.tessell.com/en/articles/6624929-where-are-the-databases-hosted-in-tessell (accessed Apr. 6, 2023).

Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).

Barr, Jeff. "New—Cross-Account Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).

Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Bucur, et al., "Multi-Cloud Resource Management Techniques for Cyber-Physical Systems", MDPI, Dec. 15, 2021, https://www.ncbi.nlm.nih.gov/pmc/articles/PMC8706026/.

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).

CommVault. "Adding a Database Group for Alibaba Cloud ApsaraDB RDS for MySQL" Essential. Sep. 22, 2020. Retrieved from https://documentation.commvault.com/v11/essential/122970_adding_database_group_for_alibaba_cloud_apsaradb_rds_for_mysql.html (accessed Aug. 30, 2023).

CommVault. "Creating a Server Backup Plan" Essential. Nov. 6, 2020. Retrieved from https://documentation.commvault.com/v11/essential/130962_creating_server_backup_plan.html (accessed Aug. 30, 2023).

CommVault. "Restoring a Database Group for Alibaba Cloud ApsaraDB RDS for MySQL" Essential. Feb. 18, 2021. Retrieved from https://documentation.commvault.com/2023e/essential/122176_restoring_database_group_for_alibaba_cloud_apsaradb_rds_for_mysql.html (accessed Aug. 30, 2023).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Cunnhingham, "Introducing PlanetScale Managed Cloud", Nov. 3, 2021, https://planetscale.com/blog/introducing-planetscale-managed-cloud.

DBInsight. "Turn your Database into a Service" A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.

Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.

(56) References Cited

OTHER PUBLICATIONS

Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.

Delphix Corp., "FAQ: SnapShot and SnapSync (KBA1014)," Delphix, published Mar. 4, 2022, retrieved Jan. 2, 2023 from https://support.delphix.com/Continuous_Data_Engine_(formerly_Virtualization_Engine)/Delphix_Ad min/FAQ%3A_SnapShot_and_SnapSync_(KBA1014).

Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.

Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.

Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.

Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Delphix, "Understanding SnapSync and LogSync for Oracle" (May 5, 2013) from https://www.delphix.com/blog/data-virtualization/understanding-snapsync-and-logsync-oracle (accessed Jan. 7, 2020).

Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).

Drake, Sam et al. "Architecture of Highly Available Databases" International Service Availability Symposium, pp. 1-16. Springer, Berlin, Heidelberg, 2004. (Year: 2004).

Dremio, "Multiple AWS Clusters" Dremio. 2020. Received from https://docs.dremio.com/deployment/provisioning-ec2.html (Year: 2020).

Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).

Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).

Ex Parte Quayle Action with Refs. on U.S. Appl. No. 29/733,571 Dtd Feb. 11, 2022.

Extended European Search Report re EP21192308.1 Dtd Jan. 24, 2022.

Extended European Search Report re EP21192379.2 Dtd Jan. 26, 2022.

Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).

Fenton, Tom, "How to Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Final Office Action on U.S. Appl. No. 16/234,547 Dtd May 11, 2023.

Final Office Action on U.S. Appl. No. 16/234,547 Dtd Sep. 9, 2022.

Final Office Action on U.S. Appl. No. 16/234,547 Dtd Oct. 5, 2021.

Final Office Action on U.S. Appl. No. 16/805,581 Dtd Jul. 6, 2022.

Final Office Action on U.S. Appl. No. 17/006,595 Dtd Oct. 14, 2021.

Final Office Action on U.S. Appl. No. 17/182,511 Dtd Dec. 6, 2022.

Final Office Action on U.S. Appl. No. 17/337,197 Dtd Dec. 15, 2022.

Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).

Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).

Foreign Action other than Search Report on EP 21192308.1 Dtd Apr. 6, 2022.

Foreign Action other than Search Report on EP 21192308.1 Dtd Jun. 10, 2022.

Foreign Action other than Search Report on EP 21192379.2 Dtd Jun. 15, 2022.

Foreign Search Report on PCT Dtd Sep. 7, 2023.

FreeCodeCamp. "MongoDB Atlas Tutorial—How to Get Started" FreeCodeCamp. Feb. 4, 2021. Retrieved from https://www.freecodecamp.org/news/get-started-with-mongodb-atlas/ (accessed Sep. 28, 2023).

Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017 /07 / designing-perfect-date-time-picker/> (Year: 2017).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Geek University, "VM snapshot files," VMware ESXi course, retrieved Sep. 11, 2022 from https://geek-university.com/vm-snapshot-files/.

Geier, Eric, "Using Static IP Addresses on Your Network" Cisco Press. Sep. 14, 2009. Received from https://www.ciscopress.com/articles/article.asp?p=1393495. (Year: 2009).

GitHub. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).

Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).

Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).

Google Cloud. "Deployment Manager Fundamentals" Cloud Deployment Manager. Feb. 27, 2021. Retrieved from https://web.archive.org/web/20210227173536/https:/cloud.google.com/deployment-manager/docs/fundamentals (accessed Sep. 6, 2023).

Google Cloud. "Rest Resource: subnetworks" Compute Engine. Jul. 1, 2019. Retrieved from https://cloud.google.com/compute/docs/reference/rest/beta/subnetworks (accessed Sep. 6, 2023).

Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).

Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).

Guevara, Introducing PlanetScale Insights: Advanced query monitoring, May 26, 2022, https://planetscale.com/blog/introducing-planetscale-insights-advanced-query-monitoring.

(56)           References Cited

OTHER PUBLICATIONS

Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).

HammerSpace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).

Hashicorp Terraform. "tessell_dap (Data Source)" Tessell. 2023. Retrieved from https://registry.terraform.io/providers/TessellDevelopment/tessell/latest/docs/data-sources/dap#nestedatt--target_cloud_locations (accessed Apr. 6, 2023).

Hashicorp Terraform. "tessell_database_backup (Resource)" tessell. 2023. Retrieved from https://registry.terraform.io/providers/TessellDevelopment/tessell/latest/docs/resources/database_backup (accessed Apr. 6, 2023).

Hashicorp Terraform. "tessell_db_service (Resource)" tessell. Jun. 2023. Retrieved from https://registry.terraform.io/providers/tessell-cloud/tessell/latest/docs/resources/db_service#snapshot_configuration (accessed Apr. 6, 2023).

Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).

Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).

Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).

Hosterman, Cody, "Introducing vSphere Virtual Volumes on the FlashArray" PureStorage, (Jun. 13, 2017) from https://blog.purestorage.com/purely-technical/introducing-vsphere-virtual-volumes-on-the-flasharray/ (accessed Jun. 28, 2021).

Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).

Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).

Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).

IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).

Jain, Viral. "How to Create SQL Database in AWS" C-Sharp Corner. May 4, 2018. Retrieved from https://www.c-sharpcorner.com/article/how-to-create-sql-database-in-aws/ (accessed Jul. 26, 2023).

Kaplan, Steve. "The Tessellator Crunches Cloud Costs" Tessellator Book Dec. 1, 2022. Retrieved from https://tessell.com/documents/Tessellator%20Book%201.pdf (accessed Apr. 6, 2023).

Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql-deployments (Year: 2020).

Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7891-1 (Year: 2017).

Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).

Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).

Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).

Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).

Kubernetes. "Authenticating" Kubernetes Documentation. Jul. 12, 2018. Retrieved from https://kubernetes.io/docs/reference/access-authn-authz/authentication/ (accessed Oct. 11, 2023).

Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).

Kubernetes. "Nodes" Kubernetes Documentation. Jul. 14, 2017. Retrieved from https://kubernetes.io/docs/concepts/architecture/nodes/ (accessed Oct. 11, 2023).

Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).

Kubernetes. "PKI certificates and requirements" Kubernetes Documentation. Jun. 16, 2019. Retrieved from https://kubernetes.io/docs/setup/best-practices/certificates/ (accessed Oct. 11, 2023).

Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).

Launier, Jeremy et al. "Introducing A New Era in Database Management" Nutanix. Oct. 6, 2020. Retrieved from https://www.nutanix.com/blog/introducing-new-era-in-database-management (accessed Jul. 26, 2023).

Lctree, "Lctree," Linked Clone Tree Visualizer for vCloud Director, published (Nov. 28, 2012).

Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

M. A. Metawai et al. "Load balancing in distributed multi-agent computing systems" Ain Shams Engineering Journal. ASEJ. May 23, 2012. p. 237-249. (Year: 2012).

Matijaca, Ante, "Dashboard" Dribbble, published Dec. 21, 2015, retrieved Feb. 11, 2022 from <https://dribbble.com/shots/2417233-Dashboard> (Year: 2015).

Meadowcroft, Ben, "Virtual Volumes: First Year in Review" VMware vSAN Virtual Blocks Blog (Mar. 14, 2016) from https://blogs.vmware.com/virtualblocks/2016/03/14/virtual-voulmes-first-year-in-review/ (accessed Jun. 28, 2021).

Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).

Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).

Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).

Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).

Melo, Gilson. "Overview of the Interconnect Between Oracle and Microsoft" Oracle Cloud Infrastructure Blog. Jun. 5, 2019. Retrieved

(56) References Cited

OTHER PUBLICATIONS from https://blogs.oracle.com/cloud-infrastructure/post/overview-of-the-interconnect-between-oracle-and-microsoft (accessed Sep. 14, 2023).

Microsoft Docs, "Always on availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.

Microsoft Docs, "What is an Always on availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.

Microsoft SQL, "Upgrading Always on Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).

Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.

Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).

Microsoft. "How Project schedules tasks: Behind the scenes" Project Desktop. Nov. 12, 2020. Retrieved from https://support.microsoft.com/en-us/office/how-project-schedules-tasks-behind-the-scenes-df3431ab-8d8a-4047-afc6-a87b547dbac0 (accessed Sep. 28, 2023).

Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).

Mitchell, Cal. "Migrating on Prem SQL Server to Multi Cloud With Tessell" SQLpipe. Feb. 18, 2023. Retrieved from https://www.sqlpipe.com/blog/migrating-on-prem-sql-server-to-multi-cloud-with-tessell (accessed Apr. 6, 2023).

Mongodb. "mongo Shell Methods" Reference. Aug. 2019. Retrieved from https://www.mongodb.com/docs/v4.2/reference/method/ (accessed Aug. 30, 2023).

Mongodb. "mongodb" GitHub. Mar. 2015. Retrieved from https://github.com/mongodb/docs/blob/v4.2/source/core/replica-set-priority-0-member.txt (accessed Aug. 30, 2023).

Mongodb. "Priority 0 Replica Set Members" MongoDB Manual. Aug. 2019. Retrieved from https://www.mongodb.com/docs/manual/core/replica-set-priority-0-member/ (accessed Aug. 30, 2023).

Mongodb. "Replica Set Elections" MongoDB Manual. Aug. 2019. Retrieved from https://www.mongodb.com/docs/manual/core/replica-set-elections/ (accessed Aug. 30, 2023).

Mongodb. "Replica Set Members" Replication. Aug. 2019. Retrieved from https://www.mongodb.com/docs/v4.2/core/replica-set-members/#replica-set-secondary-members (accessed Aug. 30, 2023).

Mongodb. "The mongo Shell" MongoDB. Aug. 2019. Retrieved from https://www.mongodb.com/docs/v4.2/mongo/ (accessed Aug. 30, 2023).

Mongodb. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).

Mongodb. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).

Mulford, Juan, "vSphere 7—Describe Instant Clone Architecture and Use Cases," Mulcas Cloudy Infrastructures, published Dec. 28, 2021, retrieved Sep. 11, 2022 from https://mulcas.com/vsphere-7-describe-instant-clone-architecture-and-use-cases/.

Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.

MVware, "Horizon Architecture", Nov. 18, 2020. https://techzone.vmware.com/resource/horizon-architecture#introduction.

MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).

Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).

Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).

Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).

Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).

Non-Final Office Action on U.S. Appl. No. 16/228,728 Dtd Mar. 24, 2020.

Non-Final Office Action on U.S. Appl. No. 16/234,547 Dtd Feb. 22, 2022.

Non-Final Office Action on U.S. Appl. No. 16/234,547 Dtd Apr. 15, 2021.

Non-Final Office Action on U.S. Appl. No. 16/234,547 Dtd Nov. 7, 2022.

Non-Final Office Action on U.S. Appl. No. 16/234,553 Dtd Jan. 6, 2021.

Non-Final Office Action on U.S. Appl. No. 16/805,581 Dtd Jan. 14, 2022.

Non-Final Office Action on U.S. Appl. No. 16/805,581 Dtd Oct. 12, 2022.

Non-Final Office Action on U.S. Appl. No. 17/122,740 Dtd Aug. 19, 2022.

Non-Final Office Action on U.S. Appl. No. 17/181,586 Dtd Jul. 1, 2022.

Non-Final Office Action on U.S. Appl. No. 17/182,511 Dtd Jul. 21, 2022.

Non-Final Office Action on U.S. Appl. No. 17/237,599 Dtd Oct. 14, 2022.

Non-Final Office Action on U.S. Appl. No. 17/337,197 Dtd Jun. 6, 2023.

Non-Final Office Action on U.S. Appl. No. 17/337,197 Dtd Sep. 8, 2022.

Non-Final Office Action on U.S. Appl. No. 17/694,964 Dtd Aug. 9, 2023.

Non-Final Office Action on U.S. Appl. No. 17/951,632 Dtd Sep. 14, 2023.

Notion, "Database templates," Notion Help Center, retrieved Sep. 29, 2022 from https://www.notion.so/help/database-templates.

Nutanix Inc., "Prism 5.5, Prism Central Guide" (Jul. 7, 2020) pp. 1-618.

Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.

Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.

Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.

Nutanix, "Nutanix Hybrid Cloud Infrastructure Now Available on Amazon Web Services" Nutanix Press Release. Aug. 11, 2020.

(56) References Cited

OTHER PUBLICATIONS

Received from https://www.nutanix.com/press-releases/2020/nutanix-clusters-on-aws?icid=111AJW0ZPW22N (Year: 2020).

Nutanix, Inc. "Prism Central Guide", Acropolis 5.0, (Oct. 18, 2018), pp. 1-374.

Nutanix, Inc., "Acropolis Advance Administration Guide" Acropolis 5.0 Feb. 9, 2018, pp. 1-60.

Nutanix, Inc., "Acropolis Advanced Administration Guide" Acropolis 5.1, Jul. 11, 2018, pp. 1-63.

Nutanix, Inc., "Prism Central Guide", Acropolis 5.1, (Oct. 18, 2018), pp. 1-410.

Nutanix, Inc., "Prism Web Console Guide" Prism 5.8, (Mar. 19, 2019), pp. 1-808.

Nutanix. "Multi-Cluster Management" Nutanix Support and Insights. Oct. 2020. Retrieved from https://portal.nutanix.com/page/documents/details?targetId=Nutanix-Era-User-Guide-v2_0:era-era-multicluster-management-c.html (accessed Jul. 26, 2023).

Nutanix. "Provisioning a PostgreSQL Instance" Nutanix Support and Insights. Jan. 2021. Retrieved from https://portal.nutanix.com/page/documents/details?targetId=Nutanix-Era-User-Guide-v2_3:top-era-provisioning-a-postgresql-database-t.html (accessed Jul. 26, 2023).

Nyffenegger et al., "SQL Server Instance" 2017, from https://renenyffenegger.ch/notes/development/databases/SQL-Server/architecture/instance (retrieved Jan. 25, 2022).

Opster, "High Availability in Elasticsearch—Cross Cluster Replication and Alternatives" Opster. 2020. Received from https://opster.com/blogs/elasticsearch-cross-cluster-replication-overview/ (Year: 2020).

Opster, "Multi-Cluster Load Balancer—An Alternative to Cross Cluster Replication" Opster. 2020. Received from https://opster.com/elasticsearch-multi-cluster-load-balancer/ (Year: 2020).

Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).

Oracle Cloud, "Using Oracle Autonomous Database on Shared Exadata Infrastructure" published Dec. 2022.

Oracle Communications, "Provisioning Database Interface User's Guide, Release 16.0" (Sep. 2014) Oracle, p. 1-174.

Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).

Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.

Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.

Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.

Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.

Oracle, "Oracle Exadata Cloud@Customer X9M", Version 1.17, 2022, https://www.oracle.com/dk/a/ocom/docs/engineered-systems/exadata/exacc-x9m-ds.pdf.

Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.

Oracle, "Using the DBaaS Self Service Portal," Cloud Administration Guide, Nov. 30, 2021. retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.

Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.

Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).

Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).

Oracle. "Exadata Database Service on Cloud@Customer Security Controls" Oracle Gen 2 Exadata Database Service on Cloud@Customer Security Controls. Oct. 26, 2020. Retrieved from https://www.oracle.com/a/ocom/docs/engineered-systems/exadata/exadata-cloud-at-customer-security-controls.pdf (accessed Oct. 9, 2023).

Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).

Oracle. "Update Your Database Homes and Grid Infrastructure via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 23).

Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).

Oracle. "Using DBMS_Rolling to Perform a Rolling Upgrade" Concepts and Administration. Sep. 2020. Retrieved from https://docs.oracle.com/en/database/oracle/oracle-database/19/sbydb/using-DBMS_ROLLING-to-perform-rolling-upgrade.html#GUID-70C09F5B-90BE-4C8C-96A5-45A52E05D380 (accessed Aug. 30, 2023).

Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).

Patil, Manoj E. et al. "Design and Implementation of Graphical User Interface for Relational Database Management System" (2012), International Jounral of Computer Science and Information Technologies (IJCSIT), vol. 3 (3), p. 3871-3874.

Planetscale, Deployment Options Documentation, Aug. 1, 2022, https://planetscale.com/docs/concepts/deployment-options#cloud.

PlanetScale, Query Insights Documentation, 2022, https://planetscale.com/docs/concepts/query-insights#insights-page-overview.

PlanetScale, The MySQL-compatible serverless database platform, 2022, https://planetscale.com.

PlanetScale. "PlanetScale is the world's most advanced serverless MySQL platform" PlanetScale. Retrieved from https://planetscale.com/ (accessed Apr. 6, 2023).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).

Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).

Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).

Progress. "Simple tenancy" Progress Documentation. Apr. 12, 2017. Retrieved from https://docs.progress.com/bundle/openedge-database-management-117/page/Simple-tenancy.html (accessed Sep. 28, 2023).

Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).

Progress. "Tenant-ID() method" Progress Documentation. Jun. 2011. Retrieved from https://docs.progress.com/bundle/abl-reference/page/TENANT-ID-method.html# (accessed Sep. 28, 2023).

Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).

Quest. "Creating custom User-defined Database Groups" Support. Aug. 16, 2017. Retrieved from https://support.quest.com/kb/4229519/creating-custom-user-defined-database-groups (accessed Aug. 30, 2023).

Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.

Rawat, Maneesh. "Nitro Boost your PostgreSQL Workloads" PGConf India. Feb. 23, 2023. Retrieved from https://pgconf.in/conferences/pgconfin2023/program/proposals/356 (accessed Apr. 6, 2023).

Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).

Reed, Kate "Nutanix Introduces Database Services with Era" (published May 9, 2018) Business Wire, from https://www.businesswire.com/news/home/20180509005397/en/ (accessed Dec. 18, 2019).

Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).

Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).

Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).

Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.

Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.

Sandbu, Marius. "Tessell—A new way to provide DBaaS in Public Cloud" Marius Sandbu Tech Ramblings. Nov. 1, 2022. Retrieved from https://msandbu.org/tessell-a-new-way-to-provide-dbaas-in-public-cloud/ (accessed Apr. 6, 2023).

Sanglaji, Maryam et al. "Nutanix Era: Databases Made Simple" (published 2018) Nutanix, from https://www.nutanix.com/blog/nutanix-era-databases-made-simple (accessed Dec. 18, 2019).

Sanglaji, Maryam et al. "Nutanix Era: One-click Database Management (London)" (published 2018) Next Conference 2018, from https://next.nutanix.com/next-conference-2018-54/nutanix-era-one-click-database-manag (accessed Dec. 18, 2019).

Sanglaji, Maryam et al. "Nutanix Era: One-click Database Management" (published 2018) Next Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).

Savjani, Parikshit, "Automate your Azure Database for MySQL deployments using Arm templates," Microsoft Azure, published Nov. 1, 2018, retrieved Sep. 29, 2022 from https://azure.microsoft.com/en-us/blog/automate-your-azure-database-for-mysql-deployments-using-arm-templates/.

Sereno Cloud Solution. "Nutanix 1 Click Database Service by Era" Medium Enterprise Clouds. Jan. 2021. Retrieved from https://www.serenoclouds.com/medium-enterprise-clouds/private-hybrid-clouds/nutanix-enterprise-cloud-solution/nutanix-1-click-database-service-by-era/ (accessed Jul. 26, 2023).

Shah, Manish. "Gen 2 Exadata Cloud at Customer New Features: Shared Oracle_Home" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).

Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).

Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).

Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).

Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).

Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).

Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).

Stone, "Cross Tenant Access", LoanPro Help, https://help.loanpro.io/article/vyy37c5bhd-cross-tenant-access, accessed Jun. 29, 2022.

Storti, Brian "A Primer on Database Replication" Brianstorti.com (May 23, 2017) from https://www.brianstorti.com/replication/ (accessed Jun. 28, 2021).

Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).

Tahir, Saqlain. "Field Notes: SQL Server Deployment Options on AWS Using Amazon EC2" AWS Architecture Blog. Jun. 18, 2021.

(56) References Cited

OTHER PUBLICATIONS

Retrieved from https://aws.amazon.com/blogs/architecture/field-notes-sql-server-deployment-options-on-aws-using-amazon-ec2/ (accessed Apr. 6, 2023).

Tang, "Multi-tenant access control for cloud services", Aug. 2014, The University of Texas at San Antonio College of Sciences.

Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).

Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).

Tessell for Oracle, "Fully-managed, high-performance Oracle databases with enterprise-grade data protection, security, and compliance@ your terms", 2022, https://www.tessell.io/services/oracle.

Tessell. "Azure Tessell for Oracle" Microsoft. Retrieved from https://azuremarketplace.microsoft.com/en-us/marketplace/apps/tessellinc1655919615020.tessell_database_service?ocid=GTMRewards_WhatsNewBlog_healthcareazurecloudsecurityassessment_Vol160&tab=Overview (accessed Apr. 6, 2023).

Tessell. "Cloud Databases. Done Right. At Scale." Tessell. Retrieved from https://tessell.com/ (accessed Apr. 6, 2023).

Tessell. "Differentiated Infrastructure. Delightful Management." Tessell. 2023. Retrieved from https://query.prod.cms.rt.microsoft.com/cms/api/am/binary/RW13XNT (accessed Apr. 6, 2023).

Tessell. "Migrating a #SQLServer #database to a multi-cloud environment poses many challenges." Twitter. Retrieved from https://twitter.com/tessell/status/1631039267672674304 (accessed Apr. 20, 2023).

Tessell. "Multi-AZ High Availability for Oracle Standard Edition 2" Tessell. Jun. 2022. Retrieved from https://query.prod.cms.rt.microsoft.com/cms/api/am/binary/RW13XNV (accessed Apr. 6, 2023).

Tessell. "Plans & Pricing" Tessell. Retrieved from https://tessell.com/pricing?show=service (accessed Apr. 6, 2023).

Tessell. "Pricing Guide" Tessell. Retrieved from https://tessell.com/pricing/guide?engine=PostgreSQL&cloud=AWS&workload=High Performance&deploymentOption=Professional&workflow=self (accessed Apr. 6, 2023).

Tessell. "Product Help, FAQs, Knowledge Base, and more . . . " Tessell. Retrieved from https://help.tessell.com/en/ (accessed Apr. 6, 2023).

Tessell. "Product Overview" AWS Marketplace. Retrieved from https://aws.amazon.com/marketplace/pp/prodview-h2caqujt4pp3q (accessed Apr. 6, 2023).

Tessell. "Tessell Database as a Service" AWS Marketplace. Retrieved from https://aws.amazon.com/marketplace/seller-profile?id=37c6e91e-5c34-43b2-b938-91ac9f9b9a73 (accessed Apr. 6, 2023).

Tessell. "Tessell for Enterprises" Tessell. Jan. 2023. Retrieved from https://tessell.com/platform/enterprises (accessed Apr. 6, 2023).

Tessell. "Tessell for MySQL" Tessell. Mar. 2023. Retrieved from https://tessell.com/services/mysql (accessed Apr. 6, 2023).

Tessell. "Tessell for Oracle" Tessell. Dec. 2022. Retrieved from https://tessell.com/services/oracle (accessed Apr. 6, 2023).

Tessell. "Tessell for PostgreSQL" Tessell. Retrieved from https://tessell.com/services/postgresql (accessed Apr. 6, 2023).

Tessell. "Tessell for SQL Server" Tessell. Jan. 2023. Retrieved from https://tessell.com/services/sqlserver (accessed Apr. 6, 2023).

Tessell. "Tessell for Startups" Tessell. Retrieved from https://tessell.com/platform/developers (accessed Apr. 6, 2023).

Tessell. "Tessell" Twitter. Retrieved from https://twitter.com/tessell (accessed Apr. 20, 2023).

Tessell. "Tessell" YouTube. Retrieved from https://www.youtube.com/channel/UCMSdbKchVXPIEreaRbW-fLw?app=desktop (accessed Apr. 6, 2023).

Tessell. "The Tessell platform provides unparalleled security for your data and users" Tessell. Jun. 2022. Retrieved from https://query.prod.cms.rt.microsoft.com/cms/api/am/binary/RW13XNU (accessed Apr. 6, 2023).

Tessell. "We take care of your data infrastructure and data management needs" Tessell. Retrieved from https://www.tessell.com/about-us (accessed Apr. 6, 2023).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

Tudip Digital. "What is Deployment Manager?" Tudip. Jun. 24, 2019. Retrieved from https://tudip.com/blog-post/what-is-deployment-manager/ (accessed Sep. 6, 2023).

US Office Action on U.S. Appl. No. 17/006,595 Dtd Aug. 27, 2021.

Virtualization Works, "VMware vFabric Data Director" Virtualization Works: VMware Authorized Online Reseller, (Jun. 2021) from https://www.virtualizationworks.com/vFabric-Data-Director.asp#:~: text=VMware%C2%AE%20vFabric%E2%84%A2%20Data,agility%20and%20reducing%20database%20TCO (accessed Jun. 28, 2021).

Viveros, P., et al. "Optimal grouping and scheduling of preventive maintenance activities" Research Publishing, Singapore. Nov. 1, 2020. Retrieved from https://re.public.polimi.it/retrieve/handle/11311/1181262/685019/ (accessed Sep. 28, 2023).

VMWare "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).

VMware Horizon, "Horizon Control Plane Services Architecture", Sep. 2021, https://images.techzone.vmware.com/sites/default/files/resource/horizon_control_plane_services_architecture_noindex.pdf.

VMware Tanzu, "Innovate and grow your business on any and many clouds-fast", 2022.

VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.

VMware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-AB0D3642B788.html.

VMware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.

VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.

VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.

VMware, "Horizon Cloud on Microsoft Azure Architcture", https://techzone.vmware.com/resource/horizon-cloud-on-microsoft-azure-architecture#introduction.

VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-

(56)         References Cited

OTHER PUBLICATIONS

Cloud-Service/services/hzncloudmsazure.admin15/GUID-9EE86FC9-49CB-4995-8346-3AA76CCE96F8.html.

VMware, "Horizon Control Plane Services Architecture", Sep. 2021, https://images.techzone.vmware.com/sites/default/files/resource/horizon_control_plane_services_architecture_noindex.pdf.

VMware, "Horizon Messaging", Nov. 16, 2022. https://docs.vmware.com/en/VMware-Horizon-7/7.13/horizon-architecture-planning/GUID-39B5D03B-F619-4355-A30A-F8544D95539C.html.

VMware, "Learn More About Network Profiles in vRealize Automation Cloud", Jan. 23, 2022. https://docs.vmware.com/en/vRealize-Automation/services/Using-and-Managing-Cloud-Assembly/GUID-01E442EE-4004-4ED1-AA32-9CF73F24CB09.html.

VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.

VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.

VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.

VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.

VMware, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.

VMware, "VMware Horizon 7 Instant-Clone Desktops and RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.

VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.

VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.

VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.

VMware, "vRealize Automation Cloud and VMware Cloud on AWS", May 11, 2021. https://www.vmware.com/content/dam/digitalmarketing/vmware/en/pdf/vrealize-automation/vmw-vrealize-automation-cloud-on-aws-solution-brief.pdf.

VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).

VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).

VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).

VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).

VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).

VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).

VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmw are-whats-new-vsphere-virtual-volumes.pdf (accessed Jun. 2, 2021).

VMware, Cloud Control Plane Management, "Horizon Control Plane Services", Mar. 3, 2021. https://www.vmware.com/in/products/horizon/controlplane.html.

VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.

Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).

Warner, Alex et al., "Chapter 16—Canarying Releases" (published 2018) Google Workbook published by O'Reilly Media, Inc., from https://sre.google/workbook/canarying-releases/ (accessed Sep. 14, 2021).

Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).

WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).

Westermann, Daniel. "pg_auto_failover: Failover and switchover scenarios" Application Integration & Middleware. Nov. 11, 2020. Retrieved from https://www.dbi-services.com/blog/pg_auto_failover-failover-and-switchover-scenarios/ (accessed Jul. 26, 2023).

Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).

Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 23).

YouTube Video for Delphix Corp., "How to Create Database Copies with Delphix," YouTube, Apr. 3, 2018, https://www.youtube.com/watch?v=1EjR-k4EJ68 [youtube.com].

YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].

YouTube Video screenshots for "Nutanix Business Critical Applications & Databases—Next Europe 2019," YouTube, Oct. 16, 2019, https://www.youtube.com/watch?v=KI7IEmm6j60 [youtube.com].

YouTube Video screenshots for "Nutanix Era .Next 2019 Demo," YouTube, May 10, 2019, https://www.youtube.com/watch?v=8hbpfrOSw0U [youtube.com].

(56) References Cited

OTHER PUBLICATIONS

YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGolVFBuU [youtube.com].

YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGolVFBuU [youtube.com].

YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].

YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].

YouTube Video screenshots for AOS Note. "How to Create an RDS Database Using CloudFormation" YouTube. Feb. 17, 2021. https://youtu.be/h73xPAwffec [youtube.com].

YouTube Video screenshots for Cloud Advocate. "Google Cloud Deployment Manager—Getting Started" YouTube. Aug. 28, 2020. https://youtu.be/qVKp7W1bfrE [youtube.com].

YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].

YouTube Video screenshots for Nutanix University. "How to Provision a PostgreSQL cluster using Nutanix Era | Nutanix University" YouTube. Aug. 8, 2019. https://youtube.com/watch?v=FoDGtORWNnU [youtube.com].

YouTube Video screenshots for Nutanix. "Zero Byte Clone Data Management | Build it Better: DBaaS with Nutanix Era | Part 2%" YouTube. Mar. 17, 2021. https://youtube.com/watch?v=XIGtTA2dM80 [youtube.com].

YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).

YouTube Video screenshots for Tessell. "Eliminate IOPS metering for your cloud data infrastructure" YouTube. Oct. 20, 2022. https://www.youtube.com/watch?v=Puk0fQ43PmA [youtube.com].

YouTube Video screenshots for Tessell. "Tessell DBaaS on your choice of cloud at your terms" YouTube. Sep. 14, 2022. https://www.youtube.com/watch?v=sfWo0KyT1Do [youtube.com].

YouTube Video screenshots for Tessell. "Tessell. Choice. Power to you." YouTube. Mar. 6, 2023. https://www.youtube.com/watch?v=4DduLUdikRY [youtube.com].

YouTube Video screenshots for Tessell. "Why Tessell?" YouTube. Jan. 15, 2023. https://www.youtube.com/watch?v=JSOPhTgwrXl [youtube.com].

Zhang, Junchi, "vFabric Data Director 2.7 customer deck," published May 17, 2013, retrieved Sep. 11, 2022 from https://www.slideshare.net/harryaya/vfabric-data-director-27-customer-deck.

"About Snapshots and Clones", Administering Oracle Java Cloud Service, https://docs.oracle.com/en/cloud/paas/java-cloud/jscag/snapshots-and-clones 1.html#GUID-28871F48-A458-41C1-86F8-566ED842C3D5.

"Cloning a volume for an Amazon Aurora DB cluster", https://docs.aws.amazon.com/AmazonRDS/latest/AuroraUserGuide/Aurora.Managing.Clone.html.

"Dell PS Series Snapshots and Clones: Best Practices and Sizing Guidelines", Dell Storage Engineering, Nov. 2019, https://dl.dell.com/manuals/common/ps-series-snapshots-clones-bp1027_en-us.pdf.

"Enterprise Manager Cloud Administration Guide", Oracle Help Center, 2024, https://docs.oracle.com/cd/E24628_01/doc.121/e28814/cloud_db_clonesnap.htm#CEGCJCBC.

"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.

Maruthachalam, et al., "A Distributed System Design for Next Generation Storage and Remote Replication", 2014, https://ieeexplore.ieee.org/abstract/document/6814686.

BackupAssist, "https://secure.backupassist.com/support/en/backupassist/manage/calendar.htm"; "https://secure.backupassist.com/ support/en/references/backup-schedules.htm", Jul. 1, 2017 (Year: 2017).

Oracle, "https://web.archive.org/web/20170829005212/https://docs.oracle.com/cd/E24628_01lem.121/e27046/cloning_database.htm#EMLCM93230", Aug. 29, 2017 (Year: 2017).

Communication under Rule 71(3) EPC for EP application 23159241.1, Oct. 2, 2025.

Enterprise Manager Lifecycle Management Administrator's Guide, "14 Cloning Oracle Databases and Pluggable Databases", https://web.archive.org/web/20170829005212/https://docs.oracle.com/cd/E24628_01/em.121/e27046/cloning_database.htm#EMLCM93230, 2017, Oracle.

Oracle®, "Oracle® Enterprise Manager Cloud Administration Guide 120 Release 5 (12.1.0.5)E28814—19", Dec. 2015 (Year: 2015).

"Database Management Revolutionized by AI", OCI, https://www.oracle.com/artificial-intelligence/transform-database-management-with-ai/, Oct. 16, 2025.

"AI agents in Azure Cosmos DB", https://learn.microsoft.com/en-us/azure/cosmos-db/ai-agents, Mar. 9, 2025.

"MCP: Transform Database Admin Tasks with LLMs", https://builder.aws.com/content/2umKOtgxiPzrAf0RzQOdnFhGedg/mcp-transform-database-admin-tasks-with-llms, Jun. 8, 2025.

"Oracle Autonomous Database", White Paper Series, 13 pages, Sep. 2018.

"What are the future trends in DBMS technology? Advances in data and systems have led to the following advances in DBMS technology.", https://aws.amazon.com/what-is/dbms/, Oct. 16, 2025.

Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.

Marodia, Democratizing database observability with AI-assisted troubleshooting, https://cloud.google.com/blog/products/databases/inside-ai-assisted-troubleshooting-for-databases, May 13, 2025.

Oracle, "Oracle Autonomous Database Technical Overview", Version [2.1], 20 page, Jul. 2020.

An SQL Server DBA's Guide to Actifio GO, https://docs.actifio.com/static/Actifio-GO/PDFs/DBA_SQLServer.pdf, 2001.

* cited by examiner

200

700

710

705

900

1000

Update Windows Cluster     ?   ☒

1005 Update to Software Profile Version

May 2020     ⬡

Start Update

1010 ⬤ Now

1015 ○ Later

———————————— Pre/Post Commands ^ ————————————

As part of the update operation, any pending restart will occur. Updates are rolling, so no downtime is expected. Confirm this request by providing the name of the Windows Cluster, Manuf48:

1020

API Equivalent     Cancel

SYSTEM AND METHOD FOR AVAILABILITY GROUP DATABASE PATCHING

CROSS-REFERENCE TO RELATED APPLICATION

This application is a continuation of U.S. patent application Ser. No. 17/694,964, filed on Mar. 15, 2022, which claims priority to U.S. provisional Application No. 63/164, 315, filed on Mar. 22, 2021, the entireties of which are incorporated by reference herein.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a method is disclosed. The method includes performing, by a processor executing computer-readable instructions stored on a memory, a patching operation on an availability group cluster comprising a plurality of nodes, wherein the patching operation is performed in a plurality of iterations, and wherein each of the plurality of iterations comprises determining, by the processor, a current state of each of the plurality of nodes in the availability group cluster, selecting, by the processor, a next node from the plurality of nodes based on the current state of each of the plurality of nodes; and patching, by the processor, the next node, wherein the plurality of nodes designated as a secondary replica node are selected as the next node before the plurality of nodes designated as a primary replica node; wherein each of the secondary replica node is patched in accordance with a first priority; wherein upon patching each of the secondary replica node, a failover target node for patching the primary replica node is selected; wherein the failover target node is selected based on a second priority; and wherein according to the second priority, a healthy synchronous secondary replica node of the plurality of nodes is selected as the failover target node before an unhealthy synchronous secondary replica node of the plurality of nodes.

In accordance with some aspects of the present disclosure, a system is disclosed. The system includes a memory having computer-readable instructions stored thereon; and a processor executing the computer-readable instructions to: perform a patching operation on an availability group cluster comprising a plurality of nodes, wherein the patching operation is performed in a plurality of iterations, and wherein each of the plurality of iterations comprises: determining, by the processor, a current state of each of the plurality of nodes in the availability group cluster; selecting, by the processor, a next node from the plurality of nodes based on the current state of each of the plurality of nodes; and patching, by the processor, the next node, wherein the plurality of nodes designated as a secondary replica node are selected as the next node before the plurality of nodes designated as a primary replica node; wherein each of the secondary replica node is patched in accordance with a first priority; wherein upon patching each of the secondary replica node, a failover target node for patching the primary replica node is selected; wherein the failover target node is selected based on a second priority; and wherein according to the second priority, a healthy synchronous secondary replica node of the plurality of nodes is selected as the failover target node before an unhealthy synchronous secondary replica node of the plurality of nodes.

In accordance with some aspects of the present disclosure, a non-transitory computer-readable media comprising computer-readable instructions stored thereon is disclosed. The computer-readable instructions when executed by a processor cause the processor to: perform a patching operation on an availability group cluster comprising a plurality of nodes, wherein the patching operation is performed in a plurality of iterations, and wherein each of the plurality of iterations comprises: determining, by the processor, a current state of each of the plurality of nodes in the availability group cluster; selecting, by the processor, a next node from the plurality of nodes based on the current state of each of the plurality of nodes; and patching, by the processor, the next node, wherein the plurality of nodes designated as a secondary replica node are selected as the next node before the plurality of nodes designated as a primary replica node; wherein each of the secondary replica node is patched in accordance with a first priority; wherein upon patching each of the secondary replica node, a failover target node for patching the primary replica node is selected; wherein the failover target node is selected based on a second priority; and wherein according to the second priority, a healthy synchronous secondary replica node of the plurality of nodes is selected as the failover target node before an unhealthy synchronous secondary replica node of the plurality of nodes.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
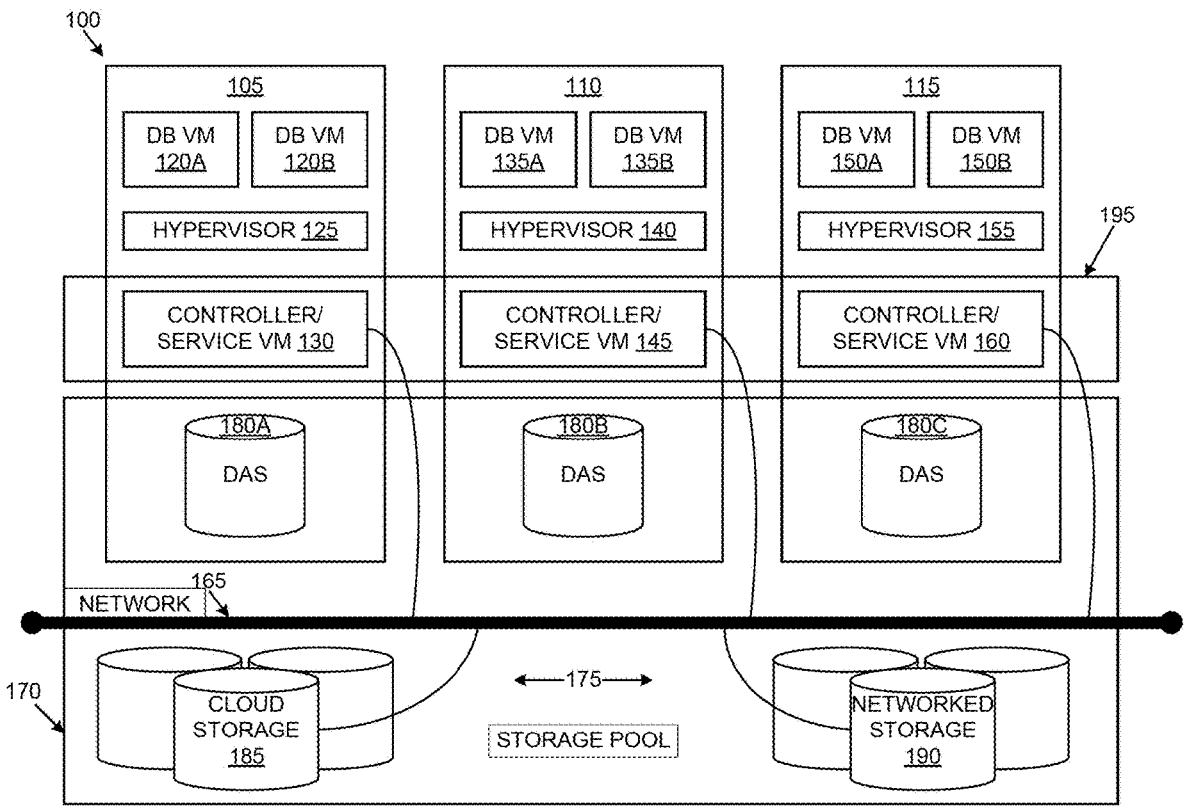
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a hyperconverged virtual computing system having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). A distributed storage system, for providing storage and protection capabilities, may be associated with the virtual computing system and shared at least partially by each of the plurality of nodes. The virtual computing system may be configured for providing one or more database management services.

Database management services may include database patching services that patch one or more databases (e.g., nodes, virtual machines, virtual disks, etc. associated with the databases) or a database server associated with the databases. Patching may involve updating the database itself or the components associated with the database (e.g., nodes, virtual machines, database server, etc.) to upgrade the database software, apply security fixes, or generally improve the operation of the database or its associated components. A patching operation may involve hours of downtime with no guarantee of success, thereby requiring dedicated human resources to oversee the operation, generally on weekends.

In some embodiments, a client may enter into a Service Level Agreement ("SLA") with a site operator of a disaster recovery site for using the disaster recovery site. The disaster recovery site is a highly engineered and reliable virtual computing system that provides data recovery and data backup facilities to the client site in accordance with the SLA and maintains a continuity of operation of the client site in the aftermath of a disaster condition. A disaster condition may include planned outages, performance related failures, component failures, power failures, natural calamities, or any other condition that hampers the normal operation of the clusters at the client sites. Generally speaking, and as used herein, a disaster condition is any condition that causes hardware failure or otherwise prevents a hardware component from operating as intended, or results in a downtime at the client site. For example, a condition that causes a malfunction of any cluster at a client site or that significantly hampers the normal operation of any clusters is referred to as a disaster condition. The disaster condition may result in a failover event. When the downtime of the client site is pre-planned, the disaster condition or failover event may be a planned failover event. When the disaster condition of failover event is not pre-planned, the disaster condition or failover event may be an unplanned failover event.

In some embodiments, the virtual computing system may be structured as an Always-On Availability Group ("AG") that provides replication of a database to multiple locations and the disaster recovery site may be part of that AG. When a disaster condition is detected at one location, a failover event may be triggered such that a copy of the database stored at another location may be used to maintain continuity of operation. The aggregation of all the locations where copies of the database are stored may form an AG cluster. Database patching services may need to be provided in the AG cluster. In some cases, to patch all the locations in the AG cluster, every location may be brought down (e.g., become offline), patched, and restarted (e.g., become online). Such downtime of the AG cluster may impede operations, violate the SLA, and may be undesirable.

Alternatively, in some cases, a rolling patching operation may be used in which each location of the AG cluster may be patched serially one after another. The order in which the locations are selected in the rolling patching operation may be random or pre-defined. Such a random or pre-defined "static" order may not consider the current state of the AG cluster, including any issues or instability in the AG cluster, and may lead to decreased performance, downtime, and may be undesirable.

The present disclosure provides technical solutions that provide improved rolling patching operations, particularly in an AG cluster (e.g., an SQL server AG environment). Specifically, the present disclosure provides a dynamic patching algorithm that intelligently and in real time (or substantially real time) determines the best order in which to select locations for a rolling patching operation. The dynamic patching algorithm is configured to select a next location to patch based on an overall current state of the AG cluster, thereby increasing performance of the AG cluster (e.g., at least by minimizing downtime of the AG cluster).

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Although the hypervisor 125, the hypervisor 140, and the hypervisor 155 are shown herein, in other embodiments, other types of virtual monitors may be used instead. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processors configured to execute instructions. The instructions may be carried out by a special purpose computer, logic circuits, or hardware circuits of the first node 105, the second node 110, and the third node 115. The processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processors, thus, execute an instruction, meaning that they perform the operations called for by that instruction.

The processors may be operably coupled to the storage pool 170, as well as with other elements of the first node 105, the second node 110, and the third node 115 to receive, send, and process information, and to control the operations of the underlying first, second, or third node. The processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processors may execute instructions without first copying the instructions to the RAM. Further, the processors may include a single stand-alone processor, or a plurality of processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processor, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VMs 150A, and the database VMs 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VMs 150A, and the database VMs 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
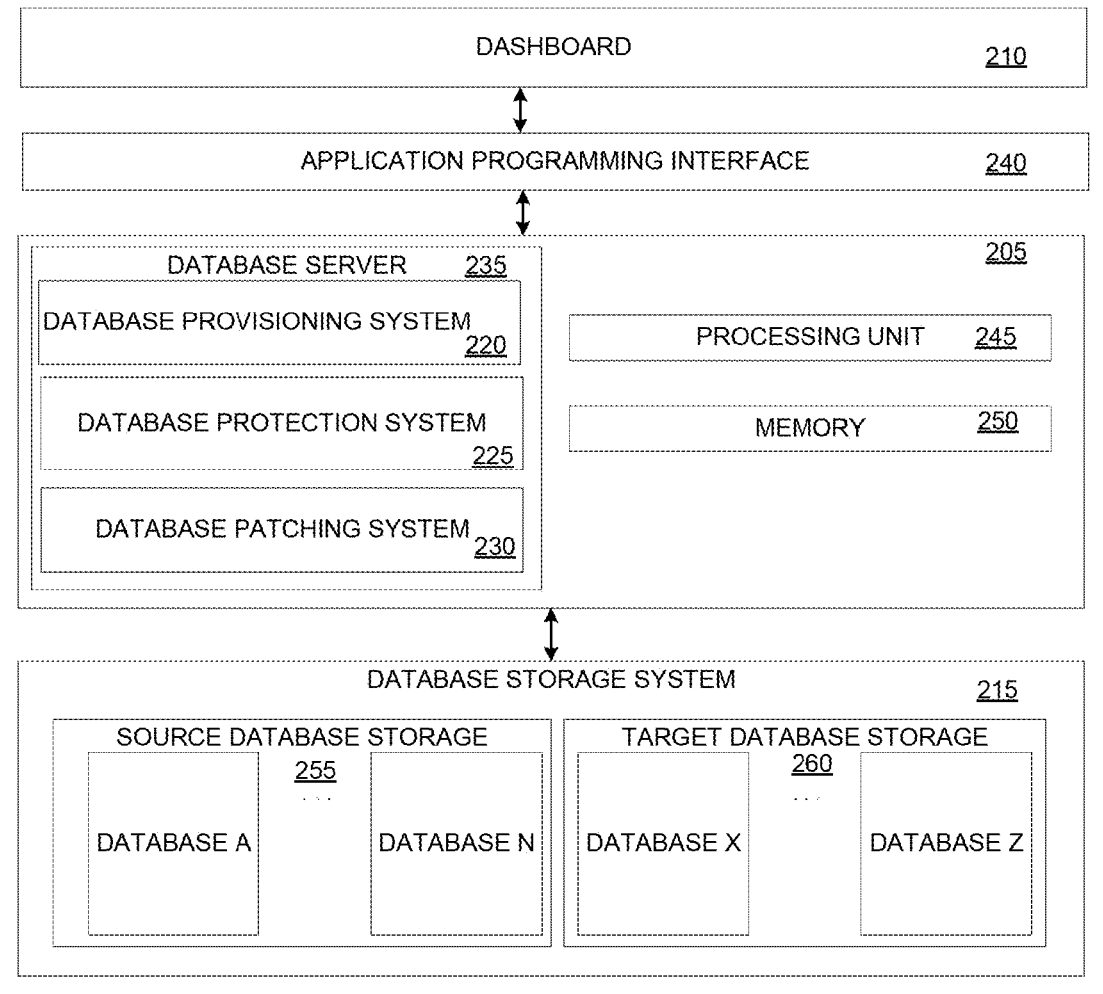
FIG. 2 is an example block diagram of a database system of the virtual computing system of FIG. 1, in accordance with some embodiments of the present disclosure.

Turning now to FIG. 2, an example block diagram of a database system 200 is shown, in accordance with some embodiments of the present disclosure. FIG. 2 is discussed in conjunction with FIG. 1. The database system 200 or portions thereof may be configured as utility software for creating and implementing database management services. The database system 200 is configured to facilitate creation/registration, protection, querying, and/or administration of databases associated therewith. In other words, the database system 200 is configured to provide a variety of database services or database management services related to the databases associated therewith. Thus, the database system 200 includes a database management system 205 (e.g., database service) that is configured to receive input from, and provide output to, a user via a dashboard 210. The database management system 205 is also associated with a database storage system 215 that is configured to store one or more databases under management of the database system 200. In association with the dashboard 210 and the database storage system 215, the database management system 205 is configured to implement one or more database management services of the database system 200. For example, the database management system 205 may be configured to provide database provisioning services to create new databases and register existing databases with the database system 200 using a database provisioning system 220. The database management system 205 may also be configured to protect databases created or registered by the database provisioning system 220 via a database protection system 225. Additional details of the database provisioning services and the database protection services are described in U.S. application Ser. No. 16/228,728, filed on Dec. 20, 2018, the entirety of which is incorporated by reference herein.

In some embodiments, the database management system 205 may be configured to provide database patching services via a database patching system 230. The database patching system 230 may be used to apply one or more patches to one or more databases under management of the database system 200. Patching may involve updating the databases stored in the database storage system 215, the virtual machines and/or nodes on which those databases are stored, and/or a database server 235 to upgrade the database software, apply security fixes, or generally improve the databases/database server or its associated elements. The database patching system 230 is described in greater detail below. The database management system 205 may be configured to provide other or additional types of database management services as well.

Although the database provisioning system 220, the database protection system 225, and the database patching system 230 are shown as separate components, in some embodiments, one or more of the database provisioning system, the database protection system, and the database patching system may be combined, and the combined component may perform the operations of the individual components. Although not shown, the database management system 205 may include other or additional components that provide other or additional database management services. The database management services (e.g., the provisioning services, protection services, patching services, etc.) may particularly be executed by the database server 235 of the database management system 205. Thus, in some embodiments, the database server 235 may implement database provisioning services via the database provisioning system 220, copy data management services via the database protection system 225, database patching via the database patching system 230, and any other database management service to the databases stored in the database storage system 215.

The database server 235, configured to provide database services, may be installed on a database VM (e.g., the database VMs 120, the database VMs 135, the database VMs 150 of FIG. 1). In some embodiments, the database server 235 may be installed via the controller/service VM (e.g., the controller/service VM 130, the controller/service VM 145, the controller/service VM 160) of the node (e.g., the first node 105, the second node 110, and the third node 115) on which the database server is to be installed. For example, an administrator desiring to install the database server 235 may download a copy on write image file (e.g., qcow or qcow2 image file) on the controller/service VM to define the content and structure of a disk volume to be associated with the database server 235. In some embodiments, instead of a copy on write image file, another type of disk image file, depending upon the type of underlying hypervisor, may be installed. Further, the administrator may create a new database VM on the node on which the database server 235 is to reside. As part of creating the new database VM, the administrator may allocate a particular number of virtual central processors (vCPU) to each of the database VMs, define the number of cores that are desired in each vCPU, designate a specific amount of memory to each of the database VMs, attach a database storage device (e.g., a virtual disk from the storage pool 170) with the database VM, and allocate other compute resources. In some embodiments, allocation of these compute resources (e.g., CPU, memory, etc.) may be provided by a compute profile. Thus, a compute profile may define the size/configuration of the database VM on which the database server 235 is to reside. In some embodiments, a default compute profile (e.g., 2vCPU, 4 GB) may be defined for the database server 235. In other embodiments, the administrator may select the compute profile from a list of available compute profiles. In some embodiments, a custom compute profile may be defined by the administrator.

In some embodiments, the administrator may also create a new network interface (e.g., associate a virtual local area network (VLAN), assign an Internet Protocol ("IP") address to access the database server 235, etc.) the database VM. Such network related details may be provided via a network profile. Thus, a network profile may identify the network location of the database VM on which the database server 235 is to reside. In some embodiments, a default network profile may be defined for the database server 235. In other embodiments, the administrator may select the network profile from a list of available network profiles. In some embodiments, a custom network profile may be defined by the administrator.

Further, in some embodiments, the administrator may also provide a software profile for the database VM of the database server 235. A software profile may define the software and operating system parameters for the database server 235. For example, in some embodiments, the software profile may include one or more software and operations system image profiles associated with a particular database engine that the is associated with the database system 200. Each software profile may define the rules that are to be applied in performing the various database management services. In some embodiments, a default software profile may be defined for the database server 235. In other embodiments, the administrator may select the software profile from a list of available software profiles. In some embodiments, a custom software profile may be defined by the administrator.

In addition to defining a compute profile, a network profile, and a software profile for the database server 235, in some embodiments, the administrator may also define a database parameter profile for the database server 235. A database parameter profile may define custom parameters (e.g., database configurations such as maximum allowed connections from clients, number of shared buffers, compaction intervals, etc.) that are applied to the database server 235. In some embodiments, a default database parameter profile may be defined for the database server 235. In other embodiments, the administrator may select the database parameter profile from a list of available database parameter profiles. In some embodiments, a custom database parameter profile may be defined by the administrator. In some embodiments, the database parameter profile (e.g., the database configuration and parameters) may be dynamically/automatically adjusted depending upon the amount of memory (and/or other compute resources) provided to the database VM of the database server 235.

Thus, the administrator may define one or more of the compute profile, the network profile, the software profile, and the database parameter profile for the database VM of the database server 235. The administrator may perform additional and/or other actions to create the database VM on which the database server 235 resides upon creation and installation of the disk image file. In some embodiments, in addition to the creation of the database VM for the database server 235 and installing the database server on the database VM, the dashboard 210 may need to be installed. In some embodiments, the installation of the database server 235 may also install the dashboard 210. In other embodiments, the dashboard 210 may need to be separately installed from the database server 235. Whether installed together with or separately from the database server 235, in some embodiments, the dashboard 210 may be installed on the same database VM as the database server 235. In other embodiments, the dashboard 210 and the database server 235 may be installed on separate database VMs but operationally associated such that a user may access the database server via the dashboard.

Upon installing the database server 235, a user (e.g., the administrator or other user authorized to access the database system 200) may access the dashboard 210. The dashboard 210 may form the front end of the database system 200 and the database management system 205, including the database server 235 and the database storage system 215, may form the backend of the database system. The database server 235 may be accessed via a computing device associated with the virtual computing system (e.g., of FIG. 1). In other embodiments, instead of or in addition to being accessible via a particular computing device, the database server 235 may be hosted on a cloud service and may be accessed via the cloud. In some embodiments, the database server 235 may additionally or alternatively be configured as a mobile application suitable for access from a mobile computing device (e.g., a mobile phone). In some embodiments, the database server 235 may be accessed via the dashboard 210, which in turn may be accessed via an Application Programming Interface ("API") 240. To access the database server 235, a user may access the dashboard 210 through the API 240. The user may use designated devices such as laptops, desktops, tablets, mobile devices, other handheld or portable devices, and/or other types of computing devices that are configured to access the API 240. These devices may be different from the computing device on which the database system 200 is installed.

In some embodiments and when the dashboard 210 is configured for access via the API 240, the user may access the dashboard via a web browser and upon entering a uniform resource locator ("URL") for the API such as the IP address of the database server 235 or other web address. Using the API 240 and the dashboard 210, the users may then send instructions to the database server 235 and receive information back from the database server. In some embodiments, the API 240 may be a representational state transfer ("REST") type of API. In other embodiments, the API 240 may be any other type of web or other type of API (e.g., ASP.NET) built using any of a variety of technologies, such as Java, .Net, etc., that is capable of accessing the database server 235 and facilitating communication between the users and the database server. In some embodiments, the API 240 may be configured to facilitate communication via a hypertext transfer protocol ("HTTP") or hypertext transfer protocol secure ("HTTPS") type request. The API 240 may receive an HTTP/HTTPS request and send an HTTP/HTTPS response back. In other embodiments, the API 240 may be configured to facilitate communication using other or additional types of communication protocols. In other embodiments, the database server 235 may be configured for access in other ways.

The dashboard 210 provides a user interface that facilitates human-computer interaction between the users and the database server 235. The dashboard 210 is configured to receive user inputs from the users via a graphical user interface ("GUI") and transmit those user inputs to the database server 235. The dashboard 210 is also configured to receive outputs/information from the database server 235 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database server 235 to perform the functions described herein.

Thus, the dashboard 210 may receive a user request (e.g., an input) from the user and transmits that user request to the database server 235. In some embodiments, the user request may be to request a database management service. For example, in some embodiments, the user request may be to request a database patching service. In response to the user request for a database patching service, the database server 235 may activate the database patching system 230. Similarly, the user may request other or additional database management services. Generally speaking, all operations performed by the database server 235 are broadly referred to herein as a database management service or a database management operation.

The database server 235 may be configured as, and/or operate in association with, hardware, software, firmware, or a combination thereof. Specifically, the database server 235 may include, or be associated with, a processor 245 configured to execute instructions for implementing the database management services of the database server. In some embodiments, each of the database provisioning system 220, the database protection system 225, and/or the database patching system 230 may have their own separate instance of the processor 245. The processor 245 may be implemented in hardware, firmware, software, or any combination thereof. "Executing an instruction" means that the processor 245 performs the operations called for by that instruction. The processor 245 may retrieve a set of instructions from a memory for execution. For example, in some embodiments, the processor 245 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 245 may be configured to execute instructions without first copying those instructions to the RAM. The processor 245 may be a special purpose computer, and include logic circuits, hardware circuits, etc. to carry out the instructions. The processor 245 may include a single stand-alone processor, or a plurality of processors that use the same or different processing technology. The instructions may be written using one or more programming language, scripting language, assembly language, etc.

The database server 235 may also include a memory 250. The memory 250 may be provisioned from or be associated with the storage pool 170. In some embodiments, the memory 250 may be separate from the storage pool 170. The memory 250 may be any of a variety of volatile and/or non-volatile memories that may be considered suitable for use with the database server 235. In some embodiments, memory 250 may be configured to store the instructions that are used by the processor 245. Further, although not shown, in some embodiments, the database provisioning system 220, the database protection system 225, and/or the database patching system 230 may each, additionally or alternatively, have their own dedicated memory.

Further, the database server 235 may be configured to handle a variety of types of database engine types. For example, in some embodiments, the database server 235 may be configured to manage PostgreSQL, Oracle, Microsoft SQL server, and MySQL database engine types. In other embodiments, the database server 235 may be configured to manage other or additional database engine types. Each database that is created within or registered with the database system 200 may be of a particular "database engine type." The database engine type may identify the type of database management system (e.g., Oracle, PostgreSQL, etc.) of a particular database. By virtue of creating or registering a database with a particular database engine type, that database is managed in accordance with the rules of that database engine type. Thus, the database server 235 is configured to be operable with and manage databases associated with a variety of database engine types.

It is to be understood that only some components of the database server 235 are shown and discussed herein. In other embodiments, the database server 235, and generally the database management system 205, may also include other components that are considered necessary or desirable in implementing the various database management services discussed herein. Further, the database server 235 may also be referred to as a database service 235.

Referring still to FIG. 2, the database storage system 215 is configured to store one or more databases (e.g., customer databases) that are either created within the database system 200 or registered with the database system. The database storage system 215 may include a source database storage 255 and a target database storage 260. The source database storage 255 is configured to store the original instances of the databases (also referred to herein as source databases) that are created within or registered with the database system 200 or restored using backups. The target database storage 260 is configured to store the clones of the source databases (also referred to herein as cloned databases). In some embodiments, the source database storage 255 and the target database storage 260 may be provisioned from the storage pool 170 and may include one or more virtual disk storage. For example, in some embodiments, the source database storage 255 may be associated with one or more database VMs (referred to herein as source database VMs) and the source databases stored within the source database storage may be stored within the virtual disks associated with the source database VMs. Similarly, in some embodiments, the target database storage 260 may be associated with one or more database VMs (referred to herein as target database VMs) and the databases stored within the target database storage may be stored within the virtual disks associated with the target database VMs. In some embodiments, each source database VM may be configured to store one or more source databases and each target database VM may be configured to store one or more target databases.

In other embodiments, the source database storage 255 and the target database storage 260 may additionally or alternatively be provisioned from other types of storage associated with the database system 200. For example, in some embodiments, either or both of the source database storage 255 and the target database storage 260 may be provisioned from the database storage device attached to the database server 235. In other embodiments, the source database storage 255 and/or the target database storage 260 may be separate from the database storage device attached to the database server 235. Further, in some embodiments, the source database storage 255 and the target database storage 260 may be provisioned from the same storage. In other embodiments, the source database storage 255 and the target database storage 260 may be provisioned from separate storage devices. Thus, the source database storage 255 and the target database storage 260 may be provisioned in a variety of ways. In some embodiments, the databases in the source database storage 255 and/or the target database storage 260 may be configured as an Availability Group (AG). The AG is discussed in FIG. 3 below.

It is to be understood that only some components of the database storage system 215 are shown and discussed herein. In other embodiments, the database storage system 215, including the source database storage 255 and/or the target database storage 260, may include other components that are considered necessary or desirable in implementing the various database management services discussed herein.

Figure 3:
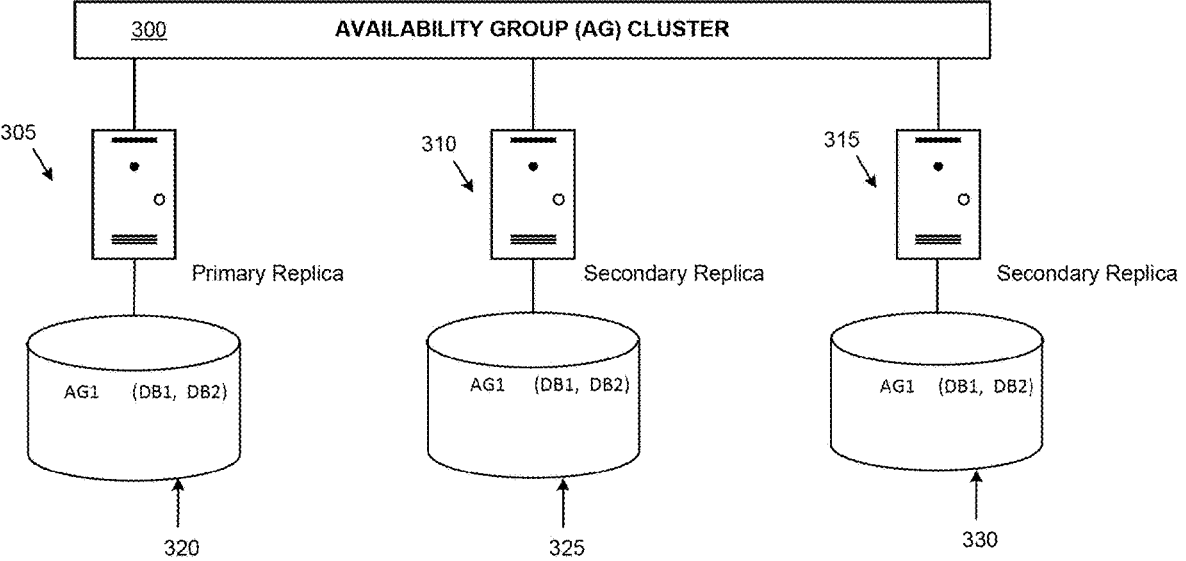
FIG. 3 is an example block diagram of an Availability Group (AG) cluster of the virtual computing system of FIG. 1, in accordance with some embodiments of the present disclosure.

Turning now to FIG. 3, an example block diagram of an AG cluster 300 is shown, in accordance with some embodiments of the present disclosure. The AG cluster 300 may be used to provide a replicated environment for a source database. A source database for which an AG cluster (e.g., the AG cluster 300) is structured may be referred to as an availability database. The AG cluster 300 provides a replicated environment that stores multiple copies of an availability database (e.g., copies of the source database in multiple locations). Thus, in some embodiments, the AG cluster 300 may include a plurality of nodes for storing multiple copies of an availability database, and each of the plurality of nodes may be designated as either a primary replica node or a secondary replica node. For example, in some embodiments, the AG cluster 300 may include a primary replica node 305 and secondary replica nodes 310 and 315.

In some embodiments, each of the primary replica node 305 and the secondary replica nodes 310 and 315 may be analogous to and, have similar elements as, the first node 105, the second node 110, and/or the third node 115. In other embodiments, each of the primary replica node 305 and the secondary replica nodes 310 and 315 may be part of the same node (e.g., one of the first node 105, the second node 110, or the third node 115), but may reside on separate database virtual machines (e.g., the database VMs 120, the database VMs 135, the database VMs 150) of that node. Thus, although the term "node" is used to describe the primary replica node 305 and the secondary replica nodes 310 and 315, in some embodiments, the "nodes" may mean virtual machines. Further, in some embodiments, the primary replica node 305 and each of the secondary replica nodes 310 and 315 may be part of the same cluster (e.g., the cluster 100), while in other embodiments, one or more of the primary replica node and/or one or more of the secondary replica nodes may be part of separate clusters. Thus, the primary replica node 305 and the secondary replica nodes 310 and 315 may be configured in a variety of ways.

Because there are three total number of nodes (e.g., the primary replica node 305 and the secondary replica nodes 310, 315) in the AG cluster 300, the AG cluster provides an AG of 3. It is to be understood that in other embodiments, the AG cluster 300 may include greater than or less than three nodes. Specifically, in some embodiments, the AG cluster 300 may include greater than or less than two secondary replica nodes (e.g., the secondary replica nodes 310 and 315). In some embodiments, the AG cluster 300 may include greater than one primary replica node (e.g., the primary replica node 305). In other words, the AG cluster 300 may have an availability group of greater than 3 or less than 3 depending upon the total number of nodes in the AG cluster 300.

The AG cluster 300 is shown to include a set of availability databases 320 (e.g., DB1, DB2). Although the set of availability databases 320 is shown to include two databases (e.g., DB1, DB2), in other embodiments, the set of availability databases may include a single availability database or greater than two availability databases. Further, although the set of availability databases 320 are described as being stored on "nodes," it is to be understood that the set of availability databases are in fact stored on one or more storage devices associated with those nodes. The set of availability databases 320 may be hosted on the primary replica node 305 and replicated, for database protection, to the secondary replica nodes 310 and 315 of the AG cluster 300 as copies 325 and 330, respectively.

It is to be understood that although the description above describes and FIG. 3 shows creating copies of the entire set of availability databases 320 (e.g., DB1, DB2), in some embodiments, copies of only a subset of the set of availability databases may be created. Thus, in some embodiments, one or more copies of one or more databases (e.g., DB1 or DB2) in the set of availability databases 320 may be created and stored on the secondary replica nodes 310 and 315. Further, although not shown, in some embodiments, one or more copies of one or more databases in the set of availability databases 320 may be stored on the primary replica node 305 as well.

In some embodiments, read/write operations on the databases (DB1, DB2) of the set of availability databases 320 may be performed on the primary replica node 305. In some embodiments, the copies 325 and 330 of the set of availability databases 320 on each of the secondary replica nodes 310 and 315, respectively, may be updated, synchronously or asynchronously, based on the set of availability databases on the primary replica node 305. Synchronous replication may entail updating the copies 325, 330 (or creating new copies and deleting the old ones) instantaneously or substantially instantaneously as changes are made to any database in the set of availability databases 320 on the primary replica node 305, thereby ensuring that the copies are constantly updated. Asynchronous replication may entail updating the copies 325, 330 (or creating new copies and deleting the old ones) on the secondary replica nodes 310 and 315 periodically (e.g., not instantaneously or substantially instantaneously).

By maintaining the copies 325 and 330 on the secondary replica nodes 310 and 315, respectively, when the primary replica node 305 becomes unavailable (e.g., due to a disaster condition), the set of availability databases 320 may be accessed and operated using the copies 325 and/or 330, thereby ensuring continuity of operation. In some embodiments, when the primary replica node 305 fails, the database management system 205 may automatically switch to one of the secondary replica nodes 310 or 315, which may assume the role of the primary replica node. Thus, the secondary replica nodes 310 and 315 may be used for disaster recovery purposes. In some embodiments, in addition to disaster recovery or instead of disaster recovery, the secondary replica nodes 310 and 315 may be used for read balancing. For example, when the primary replica node 305 is servicing a high volume of read requests (e.g., read requests greater than a predetermined threshold) on the set of availability databases 320, and since read requests do not require modification of data, in some embodiments, at least some of those read requests may be serviced from the copies 325 and/or 330, respectively, to provide read balancing. By providing read balancing, read requests may be serviced faster without overloading the resources of the primary replica node 305. In some embodiments, the secondary replica nodes 310, 315 may be used for other purposes (e.g., testing, etc.)

Additionally, since in FIG. 3, a single copy (e.g., the copies 325 and 330) of the set of availability databases 320 exists on each of the secondary replica nodes 310, 315, the AG cluster 300 has a replication factor of 1. In other embodiments, more than one copy of the set of availability databases may be provided on one or more of the secondary replica nodes 310 and 315 to have a replication factor of greater than 1. In some embodiments, each of the secondary replica nodes 310 and 315 may have the same number of copies such that the replication factor of each of the secondary replica nodes is the same. In other embodiments, each (or at least some) of the secondary replica nodes 310 and 315 may have a replication factor that is different from the other secondary replica nodes. Thus, in some embodiments, the replication factor on the secondary replica node 310 may be different from the replication factor on the secondary replica node 315. Further, although not shown, the primary replica node 305 may also store a copy of one or more databases of the set of availability databases 320. The replication factor on the primary replica node 305 may be same as or different from the replication factor on the secondary replica nodes 310 and/or 315.

When software updates or other fixes are available that need to be applied to the set of availability databases 320 (and/or the underlying components such as virtual machines, storage devices, operating system, firmware, etc. with which the availability databases 320 are associated), those updates/fixes also need to be applied to the copies 325 and 330 of the set of availability databases. Applying a patch to an AG may mean applying a patch or performing a patching operation to the availability database itself, the copies of the availability database, the node/virtual machine/virtual disk or another component associated with the availability database or the copies of the availability database, and/or the database controller (e.g., the database controller 205) managing the availability database and the copies of the availability database, the operating system, firmware, etc. For purposes of explanation only, the description below is with respect to applying a patch to a node of an AG. However, the description may be used for applying a patch similarly to other elements of the AG.

Applying a patch to a node of an AG may be complicated, particularly since conventional mechanisms require a downtime of the node on which the patch is being applied. Such downtime may be undesirable. In some embodiments, the primary replica node and all the secondary replica nodes may be patched simultaneously, causing all the nodes to be down at the same time, which may also be undesirable. Thus, in some embodiments, a rolling patching operation may be used. Using a rolling patching operation, nodes may be patched in a rolling or serial fashion. In other words, when patching of one node is complete, patching on another node begins. In some embodiments, the order in which to patch the nodes may be random. In other embodiments, the order may be pre-decided and programmed within the database patching system 230. However, such "static" orders of the rolling patching operation do not consider the current state of operations in the nodes and may degrade performance.

Further, and although not shown in FIG. 3, in some embodiments, a particular node may be a primary replica node for one availability database and the same node may be a secondary replica node for another availability database. When a patch is being applied to a node that serves as both a primary replica node and a secondary replica node, patching may be complicated even further. For example, when a first node that serves as a primary replica node for a first availability database is being patched, in some embodiments, a second node that serves as a secondary replica node for the first availability database may take over the role of the primary replica node. However, in some embodiments, the first node may also serve as a secondary replica node for a second availability database and that secondary replica node may assume the role of the primary replica node while a third node that serves as a primary replica node of the second availability database goes down. In such cases, if the first node is down due to patching, the second availability database may become unavailable until the first node is restarted, which may be undesirable. Thus, downtime of nodes that may impact the operations of the AG may be undesirable during patching.

Figure 4:
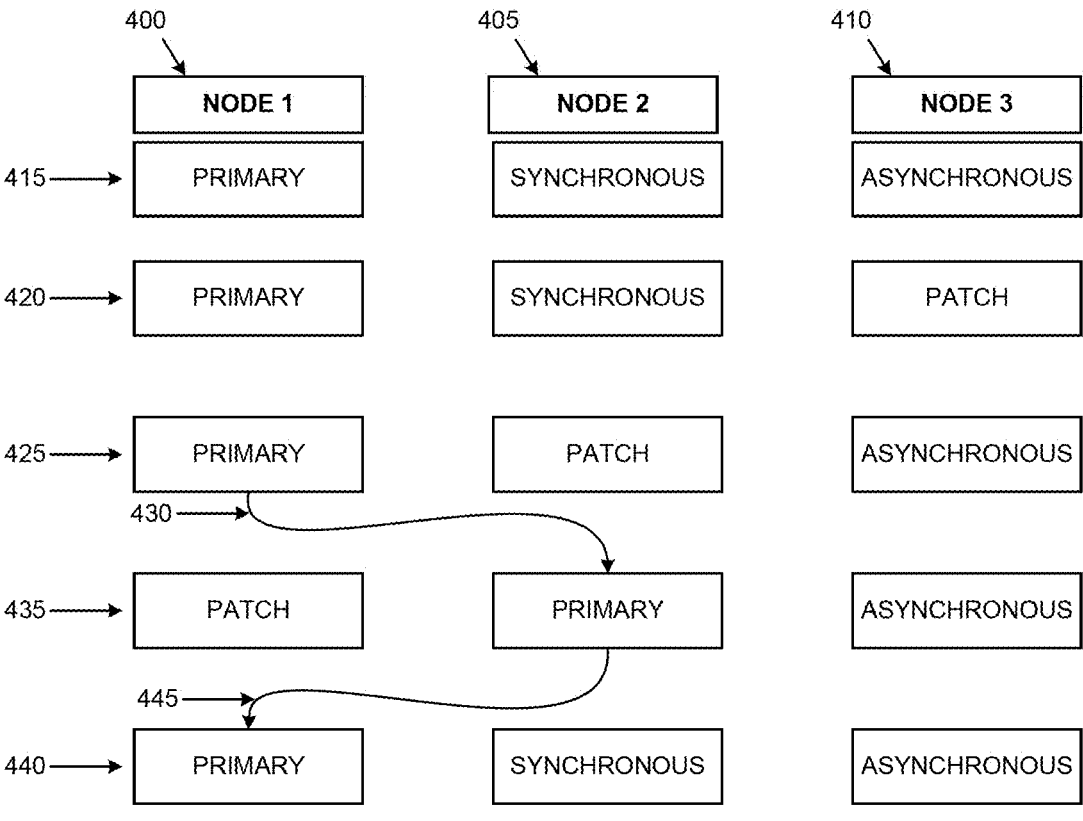
FIG. 4 is an example flow diagram showing a rolling patching operation in the AG of FIG. 3, in accordance with some embodiments of the present disclosure.

Therefore, the present disclosure provides an improved mechanism of dynamic rolling patching operations with zero or substantially zero downtime of the AG cluster 300. An example of a rolling patching operation of the present disclosure is shown in FIG. 4 below. The patching operation may be performed in any suitable way. For example, in some embodiments, a software profile may be used for patching. A software profile may define the end state of an availability database (e.g., of the node/virtual machine/virtual disk, etc. associated with the availability database) and/or the database server associated with the availability database. The software profile may capture regular changes in the software configuration (e.g., operating system changes, database software changes, other supporting software changes, etc.) over a period of time. These changes, more commonly known as patches/updates/upgrades, may be desired because of the addition of security bug fixes, enhancements, and new features in every release of the product. The software profile may help database designers in controlling and standardizing database deployments within their organizations, thereby reducing the configuration pollution. A software profile may have multiple versions, and an availability database (e.g., of the node/virtual machine/virtual disk, etc. associated with the availability database) and/or the database server associated with the availability database may be patched from any of the available versions of the software profile. In some embodiments, a first version of the database profile may be created from a base release of the patch and cumulative updates may be made to the software profile to create newer versions.

Thus, a software profile may be considered a set of gold images that represent the desired software configurations (e.g., operating system, database software disks, etc.) of the availability database (e.g., of the node/virtual machine/virtual disk, etc. associated with the availability database) and/or the database server associated with the availability database. In some embodiments, the database patching system 230 may extract the operating system and the database software disks associated with the availability database (e.g., of the node/virtual machine/virtual disk, etc. associated with the availability database) and/or the database server associated with the availability database, sanitize the disks, and store them as a template. This template may be considered a version of a software profile. To patch an availability database (e.g., of the node/virtual machine/virtual disk, etc. associated with the availability database) and/or a database server associated with the availability database, the database patching system 230 may clone the software disks from the software profile and migrate the availability database from the old software profile to the new one.

Since a software profile may define the end state for an availability database (e.g., of the node/virtual machine/virtual disk, etc. associated with the availability database) and/or the database server associated with the availability database, no matter the existing configuration, patching with a software profile may bring the availability database (e.g., of the node/virtual machine/virtual disk, etc. associated with the availability database) and/or the database server associated with the availability database to the exact software state as defined in the software profile. Thus, software profiles may minimize configuration pollution. Thus, to apply a patch to a node using a software profile, the patch (e.g., a binary file associated with the patch) may be uploaded (e.g., via the dashboard 210 to the database patching system 230 or another designated location). A new version of the software profile may be created with the uploaded patch.

The new version of the software profile version may be cloned on the availability database (e.g., of the node/virtual machine/virtual disk, etc. associated with the availability database) and/or the database server associated with the availability database being patched. The old data from the availability database (e.g., of the node/virtual machine/ virtual disk, etc. associated with the availability database) and/or the database server associated with the availability database may be migrated to the cloned software profile. For example, the old database software, the old operating system, the old database, and/or any other supporting component may be migrated to the cloned software profile. Upon migration, the old data may be deleted. Since the cloned software profile is associated with a software profile having the most recent patch, by applying the cloned software profile, the patch may be applied to the availability database (e.g., of the node/virtual machine/virtual disk, etc. associated with the availability database) and/or the database server associated with the availability database. In other embodiments, other mechanisms may be used to perform patching.

Turning now to FIG. 4, an example of a rolling patching operation in an AG cluster is shown, in accordance with some embodiments of the present disclosure. The example of FIG. 4 shows a first node 400, a second node 405, and a third node 410. In some embodiments, the first node 400 may be analogous to the primary replica node 305, and the second node 405 and the third node 410 may be analogous to the secondary replica nodes 310 and 315, respectively. The availability database stored on the first node 400 may be considered a primary copy of an availability database, and copies of the availability database stored on each of the second node 405 and the third node 410 may be considered a secondary copy of the availability database. Although FIG. 4 shows three nodes, in other embodiments, greater than or fewer than 3 nodes may be provided. Further, in some embodiments, the copy of the availability database on the second node 405 may be configured for synchronous replication with the availability database stored on the first node 400, while the copy of the availability database on the third node 410 may be configured for asynchronous replication with the availability database stored on the first node. The first node 400, the second node 405, and the third node 410 may be part of an AG cluster similar to the AG cluster 300.

Thus, before a patching begins on the AG cluster of FIG. 4, a status of each of the first node 400, the second node 405, and the third node 410 is shown at operation 415. Specifically, the operation 415 shows that the first node 400 is the primary replica node storing a primary copy of an availability database, the second node 405 is a secondary replica node storing a secondary copy of the availability database and configured for synchronous replication, while the third node 410 is a secondary replica node storing a copy of the availability database and configured for asynchronous replication. In some embodiments, the rolling patching operation may proceed by patching the secondary replica nodes before patching the primary replica nodes. Thus, in some embodiments, the second node 405 and the third node 410 may be patched before patching the first node 400. By patching the secondary replica nodes before patching the primary replica node, normal operations within the AG cluster may continue on the primary replica node while the secondary replica nodes are being patched to minimize disruptions or downtime in the AG cluster.

Further, in some embodiments, of the secondary replica nodes, the nodes that are configured for asynchronous replication may be patched before patching the nodes configured for synchronous replication. Thus, as shown at operation 420, the third node 410, which is configured for asynchronous replication is patched. The first node 400 and the second node 405 are not patched at this time and may continue operating as usual. By patching the asynchronous node (e.g., the third node 410) first, if the first node 400 goes down and a failover happens to the second node 410, since the second node is synchronously replicated with the first node, continuity of operation may be maintained with minimal or no data loss. Upon completing patching of the third node 410, at operation 425, the second node 405 may be patched. At the operation 425, the first node 400 is awaiting to be patched, the second node 405 is undergoing patching, while the third node 410 has completed patching.

In some embodiments, before starting a patching operation on a node, a snapshot of that node (e.g., every virtual machine on which the availability database has data) may be taken. By taking a snapshot before patching, if the patching operation fails for some reason or the node becomes unstable for some reason, the state of the node may be restored to the state before the patching operation began. Thus, before patching the second node 405, a snapshot of the second node may be taken and stored.

Upon completing patching of the secondary replica nodes (e.g., the second node 405 and the third node 410), the primary replica node (e.g., the first node 400) may begin patching. To patch the primary replica node (e.g., the first node 400), a failover operation may be performed. By performing a failover operation, in some embodiments, a secondary replica node may assume the role of the primary replica node at least temporarily. For example, before the failover operation, the first node 400 may be the primary replica node. After the failover, the second node 405 may assume the role of the primary replica node at least temporarily, as shown by arrow 430. After the failover, the first node 400 may assume the role of a secondary replica node. After the failover, operations that were being performed on the first node 400 may be performed on the second node 405. In other embodiments, the failover may occur from the first node 400 to the third node 410. By performing a failover, the AG cluster may maintain continuity of operations with minimal disruptions.

At operation 435, upon the failover to the second node 405, the first node 400 is patched. Upon completing the patching operation at the first node, at operation 440, another failover operation may be performed from the second node 405 to the first node 400, as shown by arrow 445. In other words, upon the completion of patching of the first node 400, the second node 405 may relinquish the role of the primary replica node and the first node may assume the role of the primary replica node again. After the failover, normal operations may continue as before the patching.

Figure 5:
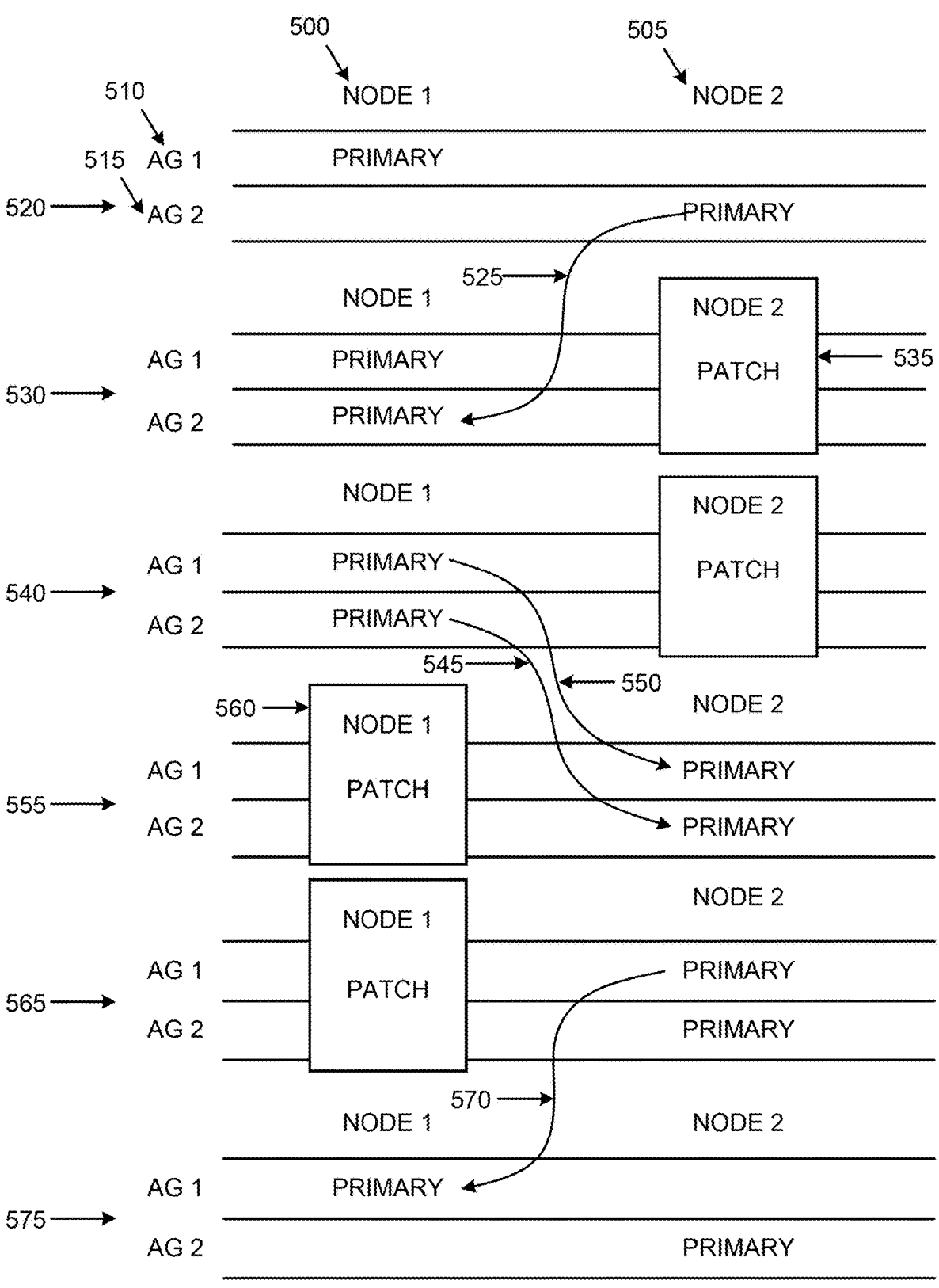
FIG. 5 is another example flow diagram showing the rolling patching operation, in accordance with some embodiments of the present disclosure.

Turning to FIG. 5, another example of a rolling patching operation is shown, in accordance with some embodiments of the present disclosure. In contrast to FIG. 4 in which each node has a single availability database, FIG. 5 shows an example in which multiple availability databases may exist on a single node. FIG. 5 shows an example with a first node 500 and a second node 505. Both the first node 500 and the second node 505 may be part of at least one AG. For example, each of the first node 500 and the second node 505 may be part of a first AG 510 and a second AG 515. Thus, each of the first node 500 and the second node 505 may be part of a first AG cluster forming the first AG 510 and a second AG cluster forming the second AG 515.

Although the patching operation is discussed with two nodes in FIG. 5, the patching operation may be performed with greater than two nodes, with each node being part of one or more AG. As part of the first AG 510, the first node 500 may include a primary copy of a first availability database. As part of the second AG 515, the first node 500 may include a secondary copy of a second availability database. The primary copy of the first availability database and the secondary copy of the second availability database may be stored on different virtual machines of the first node 500 or the same virtual machine. In other embodiments, the first node 500 may also include the primary copy of the second availability database and/or be part of additional AG storing primary and/or secondary copies of the availability databases of those additional AG.

Similarly, as part of the first AG 510, the second node 505 may include a secondary copy of the first availability database. As part of the second AG 515, the second node 505 may include a primary copy of the second availability database. The primary copy of the second availability database and the secondary copy of the first availability database may be stored on different virtual machines of the second node 505 or the same virtual machine. In other embodiments, the second node 505 may include the primary copy of the first availability database, a secondary copy of the second availability database, and/or be part of additional AG storing primary and/or secondary copies of the availability databases of those additional AG. Thus, each of the first node 500 and the second node 505 may be a primary replica node and/or a secondary replica node.

Thus, operation 520 shows the status of the first node 500 and the second node 505 before the patching operation begins. Specifically, before the patching operation begins, the first node 500 stores a primary copy of the first availability database of the first AG 510 and a secondary copy of the second availability database of the second AG 515, while the second node 505 stores a secondary copy of the first availability database of the first AG 510 and a primary copy of the second availability database of the second AG 515. At the operation 520, neither the first node 500 nor the second node 505 has been patched. When a patching operation is to be performed, as discussed above with respect to FIG. 4, the nodes that store only secondary copies of an availability database are first patched. Thus, if FIG. 5 included a node having only secondary copies of the first availability database and the second availability database, that node would be patched before either the first node 500 or the second node 505.

Furthermore, as indicated above, asynchronously replicated secondary replica nodes may be patched before synchronously replicated secondary nodes. Thus, in some embodiments, the nodes having only asynchronously replicated secondary copies may be patched before nodes having only synchronously replicated secondary copies. Further, in some embodiments, a node may have both asynchronously and synchronously replicated secondary copies of one or more availability databases. These nodes may be patched either after patching the nodes having only asynchronously replicated secondary copies or after patching the nodes having only synchronously replicated secondary copies.

Upon patching nodes having secondary copies only of the first availability database and the second availability database, nodes having at least one primary copy of the first availability database and the second availability may be patched. Thus, since each of the first node 500 and the second node 505 includes a primary copy, the patching of those nodes is performed after the patching of any nodes having secondary copies only. In some embodiments, the first node 500 and the second node 505 may be patched in series (e.g., one after another). In some embodiments, which of the first node 500 or the second node 505 to pick for patching first may vary based on a variety of factors. For example, in some embodiments, the node with a lower current workload may be selected first. In other embodiments, other considerations may be used to select either the first node 500 or the second node 505 to be patched first. In the example below, the second node 505 has been picked.

Thus, to patch the second node 505, a failover operation may be performed to migrate the primary copy of the second availability database from the second node to the first node 500, as shown by arrow 525. After the failover, the first node 500 may assume the role of the primary replica node for the second availability database. In other embodiments, assuming there are other nodes available in the second AG 515, the primary copy of the second availability database may be failed over to another node (e.g., another patched node or another node). At operation 530, the second node 505 is patched, as indicated by box 535. Upon completing patching of the second node 505, at operation 540, another failover operation may be performed from the first node 500 to the second node 505 by which the primary copy of the second availability database is migrated back to the second node and the second node resumes the role of the primary replica node for the second availability database of the second AG 515, as shown by arrow 545.

Upon completing patching of the second node 505, the first node 500 may be patched. The process of patching the first node 500 may be similar to the second node 505. Thus, a failover operation may be performed from the first node 500 to the second node 505 for the first availability database of the first AG 510 such that the second node at least temporarily assumes the role of the primary replica node for the first availability database, as shown by arrow 550.

At operation 555, upon completing failover of the first availability database to the second node 505, the first node 500 is patched, as shown by box 560. Upon completing patching of the first node 500, another failover operation is performed by which the first node resumes the role of the primary replica node for the first availability database of the first AG 510, as shown by arrow 570. Operation 575 returns the first node 500 and the second node 505 to the pre-patching operation status. In other words, the operation 575 is similar to the operation 520, with the primary copy of the first availability database of the first AG 510 being on the first node 500 and the primary copy of the second availability database of the second AG 515 being on the second node 505. However, in contrast to the operation 520, at the operation 575, the first node 500 and the second node 505 are both patched with a desired update.

Thus, the present disclosure provides a rolling patching mechanism in which asynchronously replicated secondary replica nodes are patched before synchronously replicated secondary replica nodes, which in turn are patched before primary replica nodes. By patching secondary replica nodes before primary replica nodes, and by performing failover before patching primary replica nodes, the present disclosure requires no downtime (or substantially no downtime) in the AG cluster for the patching operations. Normal operations may continue while patching is in progress.

In some embodiments, the nodes may be patched from the lowest risk node to the highest risk node. In other words, a lower risk node may be patched before a higher risk node. In some embodiments, an asynchronously replicated secondary replica node may be lower risk than a synchronously replicated secondary replica node, which in turn may be lower risk than a primary replica node. Thus, asynchronously replicated secondary replica nodes may be patched before synchronously replicated secondary replica nodes, which in turn may be patched before primary replica nodes. In other embodiments, the risk associated with the asynchronously replicated secondary replica nodes, the synchronously replicated secondary replica nodes, and the primary replica nodes may be different. In those cases, patching may be performed from the lowest risk node to the highest risk node. "Risk" may be defined in terms of maintaining continuity of operations of an AG cluster with minimal data loss, minimal disruption, or to satisfy other pre-determined criteria.

In some embodiments, a dynamic patching algorithm may be used to determine the order in which the various nodes may be patched. For example, if an AG cluster includes multiple asynchronously replicated secondary replica nodes, the dynamic patching algorithm may be used to decide the order in which those asynchronously replicated secondary replica nodes may be patched. An example dynamic patching algorithm is discussed in FIG. 6 below. The dynamic patching algorithm is an intelligent dynamic process that adapts to connectivity and synchronization issues in the AG cluster at runtime. At runtime, the dynamic patching algorithm determines, in real-time or substantial real-time, the best node to patch next based upon the operating conditions of all the nodes (e.g., a state or health of operation of the nodes) in the AG cluster. The dynamic patching algorithm may also pick the best node in the AG cluster to perform a failover before patching a node that serves as a primary replica node. In some embodiments, the dynamic patching algorithm may be atomic in nature. By being atomic in nature, if a patching operations fails on one of the nodes of an AG cluster, the patch may be removed from the other previously patched nodes of that AG cluster to avoid any computability issues resulting from different nodes having different updates.

Figure 6:
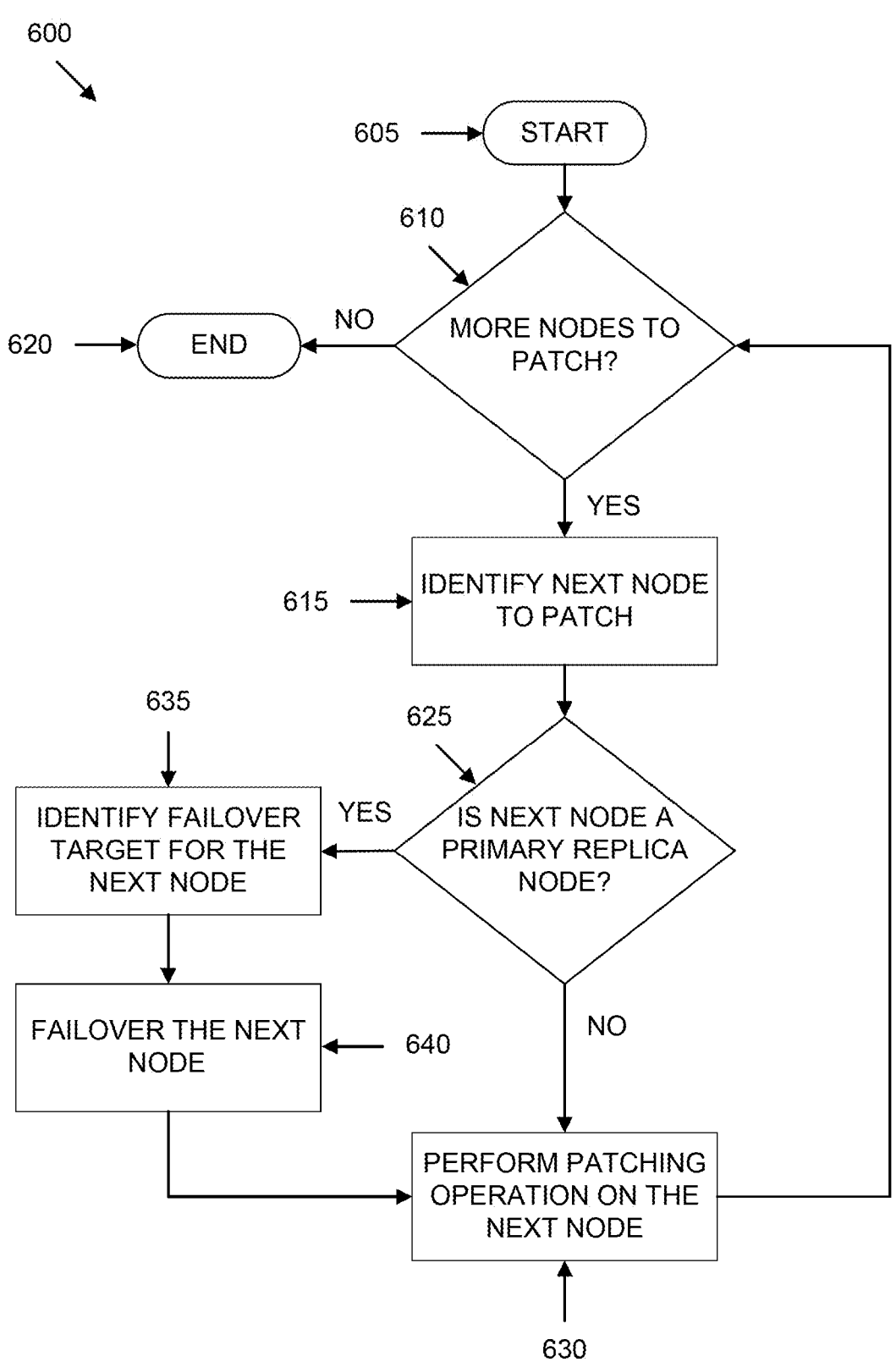
FIG. 6 is an example flow chart outlining operations of a dynamic patching algorithm for implementing the rolling patching operation of FIGS. 4 and 5, in accordance with some embodiments of the present disclosure.
Figure 7:
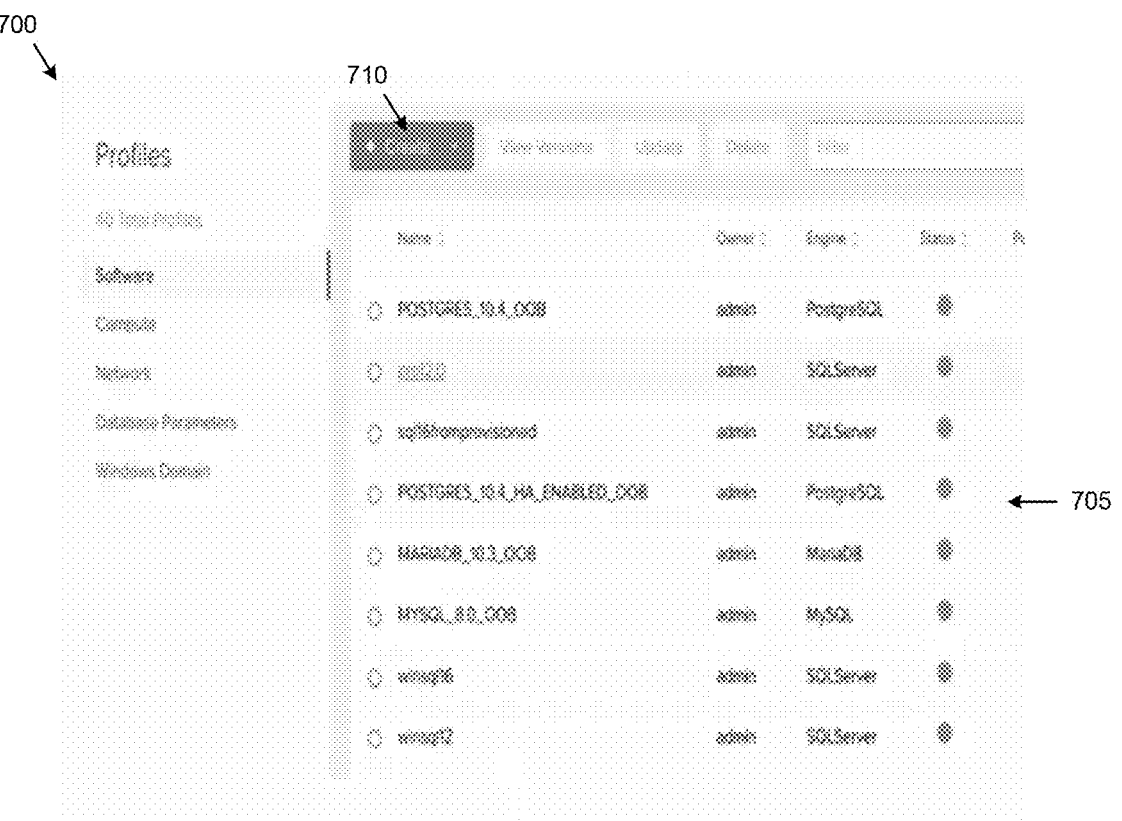
FIGS. 7-11 are example screenshots for scheduling a rolling patching operation in an AG cluster, in accordance with some embodiments of the present disclosure.

Referring now to FIG. 6, an example flowchart outlining operations of a process 600 is shown, in accordance with some embodiments of the present disclosure. The process 600 may be implemented by a controller of the database patching system 230. The controller may include a processor that may be programmed to execute computer-readable instructions stored in a memory to implement a dynamic patching algorithm and facilitate the rolling patching operations described above in FIGS. 4 and 5. The process 600 may include other or additional operations depending upon the particular embodiment. In some embodiments, the dynamic patching algorithm of the process 600 may be used to apply cumulative updates or service patches to an AG cluster. In other embodiments, the dynamic patching algorithm of the process 600 may be used for other or additional types of patching.

The process 600 starts at operation 605 when a patching operation is desired in an AG cluster. For purposes of explanation only, the process 600 is discussed with respect to FIG. 4. However, the process 600 is equally applicable to FIG. 5. At operation 610, the controller determines if the AG cluster has any unpatched nodes. When the patching operation first begins, all nodes in the AG cluster may be unpatched. However, as the nodes in the AG cluster are patched, the number of unpatched nodes may decrease. In some embodiments, the controller may perform a discovery operation to determine the current patching status of each node in the AG cluster. In other embodiments, the controller may determine the patching status of each node in the AG cluster in other ways. If, at the operation 610, the controller determines that there are unpatched nodes in the AG cluster, the process 600 proceeds to operation 615. On the other hand, if the controller determines that there are no unpatched nodes in the AG cluster, the process 600 ends at operation 620.

At the operation 615, the controller determines the next node in the AG cluster to patch. As discussed above, the dynamic patching algorithm is an intelligent algorithm that executes based on the current state of the AG cluster. In some embodiments, the controller determines the state of the AG cluster by determining a current state of operation of each of the nodes in the AG cluster. In some embodiments, the controller may determine the current state of operation of each of the nodes in the AG cluster by reviewing data (e.g., from logs, counters, etc.) associated with those clusters. In other embodiments, the controller may determine the current state of operation of each of the nodes in the AG cluster in other ways. The current state of a node may include determining a current workload on the node, whether the node is a primary replica node and/or a secondary replica node, whether the node is reporting any errors or alerts (e.g., reduced latency, increased CPU consumption, low memory, etc.), whether the node is set for asynchronous or synchronous replication, and/or other features that may be considered suitable.

Based on the current state of the AG cluster, the controller selects one node to patch from the pool of unpatched nodes in the AG cluster. In some embodiments, the controller may select the next node to patch based on a priority. Specifically, in some embodiments, each node in an AG cluster may have a priority associated therewith. The controller may be designated to select the highest priority node as the next node for patching. In some embodiments, the priority may be assigned as follows:

Primary Replica Node: 5+number of AG on the node

Unhealthy Synchronous Secondary Replica Node Local/Remote: 4

Healthy Synchronous Secondary Replica Node Local: 3

Healthy Synchronous Secondary Replica Node Remote: 2

Healthy or Unhealthy Asynchronous Secondary Replica Node: 1

Thus, in some embodiments, integer numbers may be used for assigning priority to the various nodes in the AG cluster. Although integer numbers are used above, in some embodiments, priority may be designated in other ways. In some embodiments, a priority of 1 may be considered the highest priority and 5 may be considered the lowest priority. In other embodiments, priority may be defined in other ways. Thus, in some embodiments, an asynchronous secondary replica node may have the highest priority and may be patched other nodes in the AG cluster. If there are multiple asynchronous secondary replica nodes in the AG cluster, other predetermined criteria may be used to further determine the order for patching those multiple asynchronous secondary replica nodes. In some embodiments, the multiple asynchronous secondary replica nodes may be patched in parallel.

In some embodiments, some nodes in the AG cluster may be considered "unhealthy." Any node in the AG cluster that is not "unhealthy" is considered "healthy." Healthy nodes may be patched before unhealthy nodes. A node may be considered "unhealthy" if that is node is down or unavailable, if that node is malfunctioning, if that node is unstable, or otherwise not operating normally. In some embodiments, healthy and unhealthy asynchronous secondary replica nodes may have the highest priority and may be patched first. In some embodiments, healthy asynchronous secondary replica nodes may be patched before unhealthy asynchronous secondary replica nodes.

After patching the asynchronous secondary replica nodes in the AG cluster, the healthy synchronous secondary replica nodes that are remotely located may be selected for patching. A secondary replica node may be considered "remote" if that secondary replica node is located on a different node or different cluster than the node/cluster on which the controller is located. If there are multiple remotely located healthy synchronous secondary replica nodes in the AG cluster, other predetermined criteria may be used to further determine the order for patching those multiple remotely located synchronous secondary replica nodes. Although asynchronous secondary replica nodes are not shown as being local or remote, in some embodiments, the asynchronous secondary replica nodes may also be either local or remote. In such cases, remotely located asynchronous secondary replica node may be selected for patching before locally located asynchronous secondary replica nodes.

The healthy synchronous secondary replica nodes that are locally located may be selected for patching after the patching of the remotely located synchronous secondary replica nodes. A secondary replica node may be considered "local" if that secondary replica node is located on the same node or cluster as the node/cluster that the controller is located on. If there are multiple locally located healthy synchronous secondary replica nodes in the AG cluster, other predetermined criteria may be used to further determine the order for patching those multiple locally located synchronous secondary replica nodes.

Thus, when all healthy synchronous and asynchronous secondary replica nodes have been patched, the controller may select an unhealthy synchronous secondary replica node to patch. If there are multiple unhealthy secondary replica nodes in the AG cluster, other predetermined criteria may be used to further determine the order for patching those multiple unhealthy secondary replica nodes. In some embodiments, at least a subset of the unhealthy synchronous secondary replica nodes may be patched in parallel. In some embodiments, unhealthy asynchronous secondary replica nodes may be patched after patching healthy asynchronous secondary replica nodes and before patching remotely located healthy synchronous secondary replica nodes. In other embodiments, the unhealthy asynchronous secondary replica nodes may be patched after patching all healthy synchronous and asynchronous secondary replica nodes. In some embodiments, at least a subset of the unhealthy asynchronous secondary replica nodes may be patched in parallel. In some embodiments, the unhealthy secondary replica nodes (whether synchronous or asynchronous) may be restored to a healthy state before the patching begins. In other embodiments, the unhealthy secondary replica nodes (whether synchronous or asynchronous) may be patched in an unhealthy state.

In some embodiments, a node may include both synchronous and asynchronous secondary replica nodes. In those cases, the controller may use additional criteria to determine the selection of the next node. For example, in some embodiments, if a node includes more synchronous secondary replica nodes than asynchronous secondary replica nodes, that node may be prioritized based upon priorities for synchronous secondary replica nodes (e.g., may be patched after a node having asynchronous secondary replica nodes only). Similarly, if a node includes more asynchronous secondary replica nodes than synchronous secondary replica nodes, that node may be prioritized after a node having only asynchronous secondary replica nodes but before synchronous secondary replica nodes. In some embodiments, a sum of individual priorities assigned, as above, to each synchronous secondary replica nodes and each asynchronous secondary replica nodes on a particular node may be computed. The computed sum may be the overall priority for that node. In other embodiments, other mechanisms may be used to determine the priority of a node having both synchronous secondary replica nodes and asynchronous secondary replica nodes.

Upon patching all the secondary replica nodes in the AG cluster, the controller may select a primary replica node to patch. If there are multiple primary replica nodes in the AG cluster, other predetermined criteria may be used to further determine the order for patching those multiple primary replica nodes. For example, in some embodiments, the priority of each node having at least one primary replica node may be determined based upon a sum of a predetermined integer value (e.g., 5) and the number of AG on that node. For example, in FIG. 5, each of the first node 500 and the second node 505 has two AG (e.g., the first AG 510 and the second AG 515). Thus, each of the first node 500 and the second node 505 may have a priority of a predetermined integer value (e.g., 5) plus 2 (since each node has 2 AG). If a node has at least one primary replica node (e.g., similar to the first node 500, the second node 505), that node may be treated as a lowest priority node and may be patched last (e.g., after patching all the secondary replica nodes).

Thus, each node in the AG cluster may be assigned a priority and the controller may select a highest priority node as the next node for patching. In some embodiments, the priority assigned to each node in the AG cluster may be dynamic. In other words, the priority assigned to each node may vary based upon the current state of that node. For example, if a first node that serves as a primary replica node fails causing a second node that was previously a secondary replica node to assume the role of the primary replica node, the priorities assigned to the first node and the second node may be updated to reflect the current status of the first node and the second node. Before the failover, when the first node serves as a primary replica node, the first node may have a lower priority than the second node, and may be patched after the second node. However, after the failover when the second node assumes the role of the primary replica node, the priority of the second node may be updated to be possibly lower than the first node. Similarly, in some embodiments, a healthy node may become unhealthy. For example, in some embodiments, a locally located healthy synchronous secondary replica node may become unhealthy. When that occurs, the priority of that node may be changed (e.g., lowered from 3 to 4).

Thus, at the operation 615, the controller selects the next node based upon the priorities assigned to the various nodes in the AG cluster. In some embodiments, the controller may select the highest priority node as the next node. At operation 625, the controller determines if the next node selected at the operation 615 is a primary replica node. If the next node is not a primary replica node, the process 600 proceeds to operation 630 where the next node is patched. In some embodiments, and as discussed above, the next node may be patched using a software profile. In other embodiments, other patching mechanisms may be used. In some embodiments, a patch installer may be used to facilitate the patching. In other embodiments, patching may be accomplished in other ways.

If, at the operation 625, the controller determines that the next node selected at the operation 615 is a primary replica node, the process 600 proceeds to operation 635. At the operation 635, the controller selects a failover target for the primary replica node. As indicated above, before patching a primary replica node, a failover operation is performed during which a secondary replica node assumes the roles of the primary replica node. If there is a single secondary replica node, then the controller fails over the primary replica node to that single secondary replica node. However, if there are multiple secondary replica nodes, the controller needs to pick one of those secondary replica nodes for the replica. In some embodiments, each of the secondary replica nodes may be assigned a failover target priority. The failover target priority may be different from the priority assigned to the nodes for selection of the next node at the operation 615. In some embodiments, the failover target priority may be as follows:

Patched Asynchronous Secondary Replica Node: −1
Unhealthy Unpatched Synchronous Secondary Replica Node: −2
Unhealthy Patched Synchronous Secondary Replica Node: −3
Healthy Unpatched Synchronous Secondary Replica Node: −(4+(Number of AG on the node))
Healthy Patched Synchronous Secondary Replica Node: −(5+(2*Number of AG on the node))

In some embodiments, and in contrast to the priority for selecting the next node (which is a positive number), the failover target priority may be a negative number. In other embodiments, the failover target priority may also be positive number, so long as the controller is able to differentiate between the priority for selecting the next node and the failover target priority. In other embodiments, the priority may be assigned in other ways. In some embodiments, "−1" may be the lowest priority. In some embodiments, the controller may be configured to select the highest priority node from the available secondary replica nodes. Thus, for example, in some embodiments, the controller may be configured to select a synchronous secondary replica node before selecting an asynchronous secondary replica node for failover.

Further, in some embodiments, the controller may be configured to select a healthy synchronous secondary replica node before an unhealthy synchronous secondary replica node for the failover. Additionally, in some embodiments, the controller may be configured to select a patched synchronous secondary replica node before an unpatched synchronous secondary replica node. Therefore, in some embodiments, if a healthy patched synchronous secondary replica node is available, the controller may select the healthy patched synchronous secondary replica node as the failover target. If multiple such nodes are available in the AG cluster, the controller may use other predefined criteria to select from those multiple nodes. For example, in some embodiments, the controller may pick a node to achieve load-balancing, such that a node with a lowest workload may be picked. In some embodiments, the node with the most amount of available space may be picked. Other criteria may be used in other embodiments.

If a healthy patched synchronous secondary replica node is not available in the AG cluster, in some embodiments, the controller may select a healthy unpatched synchronous secondary replica node. If an unhealthy unpatched synchronous secondary replica node is also not available, the controller may select an unhealthy patched synchronous secondary replica node. In some embodiments, the controller may wait for the unhealthy patched synchronous secondary replica node to become healthy again before starting the failover operation. If an unhealthy patched synchronous secondary replica node is not available, the controller may select an unhealthy unpatched synchronous secondary replica node. Again, the controller may wait for the unhealthy unpatched synchronous secondary replica node to become healthy before facilitating the failover operation.

If no synchronous secondary replica nodes are available in the AG cluster, the controller may select a healthy or unhealthy patched asynchronous secondary replica node as the failover target. In some embodiments, the controller may convert the asynchronous replication of the asynchronous secondary replica node into synchronous replication before the failover operation. Further, in some embodiments, the controller may wait for an unhealthy node to become healthy again before starting the failover operation. In some embodiments, if no patched asynchronous secondary replica node is available in the AG cluster, the controller may either select an unpatched asynchronous secondary replica node or wait until a patched asynchronous secondary replica node or a synchronous secondary replica node becomes available.

As indicated above, secondary replica nodes are patched before primary replica nodes. However, if a node has both a primary replica node and a secondary replica node, then that node is patched in accordance with the priority rules for the primary replica node. In such cases, the secondary replica node of that node may also remain unpatched. This unpatched secondary replica node may be used as the failover target in accordance with the failover target priority above. Thus, even though primary replica nodes are patched after secondary replica nodes, if a node has at least one primary replica node thereon, the secondary replica nodes of that node may also be patched last along with the primary replica node, and these secondary replica nodes may serve as a failover target for a primary replica node of another node.

Thus, based upon the failover target priority, the controller may select a target failover node. It is to be understood that the failover target priority above is only an example and may be varied in other embodiments. Upon selecting the target failover node at the operation 635, the controller performs a failover operation at operation 640. To perform the failover operation, the controller may designate the target failover node as the primary replica node such that operations that were previously being performed on the next node may be performed on the target failover node. After the failover operation, the next node may assume the role of a secondary replica node.

Upon performing the failover, the controller patches the next node at operation 630, as discussed above. From the operation 630, the process 600 loops back to the operation 610 to check if there are additional nodes in the AG cluster that need be patched. The process 600 may be summarized as follows:

Discover_setup
While nodes left to patch:
    Actions=Get_next_set_of_steps( )
    Perform the fetched actions

```
Get_next_set_of_steps:
    Node=find_next_node_to_patch( )
    Failover_targets=find_all_failover_targets_
        to_make_node_secondary( )
    Actions=failover tasks and patch operation
    Return actions
```

Thus, the process 600 may be repeated after patching each node, thereby accounting for any changes in the AG cluster that may have occurred while a particular node is being patched. In some embodiments, the process 600 may select the next node so as to minimize the number of failover operations. In some embodiments, when selecting a failover target, the controller may attempt to balance write load to prevent too much load on any single node. In some embodiments, snapshots of the node may be taken before patching to ensure that recovery is possible in case of failure. In some embodiments, if a node fails to patch, the controller may undo the patching operation on all the other patched nodes of the AG cluster to avoid any instability in the AG cluster.

Turning now to FIGS. 7-11, various screenshots of the dashboard 210 are shown, in accordance with some embodiments of the present disclosure. The screenshots of FIGS. 7-11 show how a patching operation may be scheduled and performed. It is to be understood that each of the screenshots of FIGS. 7-11 is only an example and not intended to be limiting in any way. To perform a patching operation using software profiles, a user may create a new version of a software profile. To create a new version of a software profile, the user may access a software profiles page 700 via the dashboard 210. The software profiles page 700 may have a list 705 of the various available software profiles. The user may select a software profile from the list 705 for which a new version is desired and interact with (e.g., click on) a create button 710.

Figure 8:

Upon clicking the create button 710, the user may be presented with a create software profile version page 800, shown in FIG. 8. The user may enter a name 805 and a description 810 for the patch. The user may also add any specific patch notes in the dialog box 815. Further, the user may select the patch file having the patch based on which the new software profile version is desired to be created. In some embodiments, the user may select the patch file from a local computer 820 or from a file share location 825. The user may also be required to enter a username/password 830 to access the patch file. Upon filling all the required information in the create software profile version page 800, the user may interact with (e.g., click on) a create button 835. The newly created software profile version may be stored in the software profiles page 700 of FIG. 7.

Figure 9:
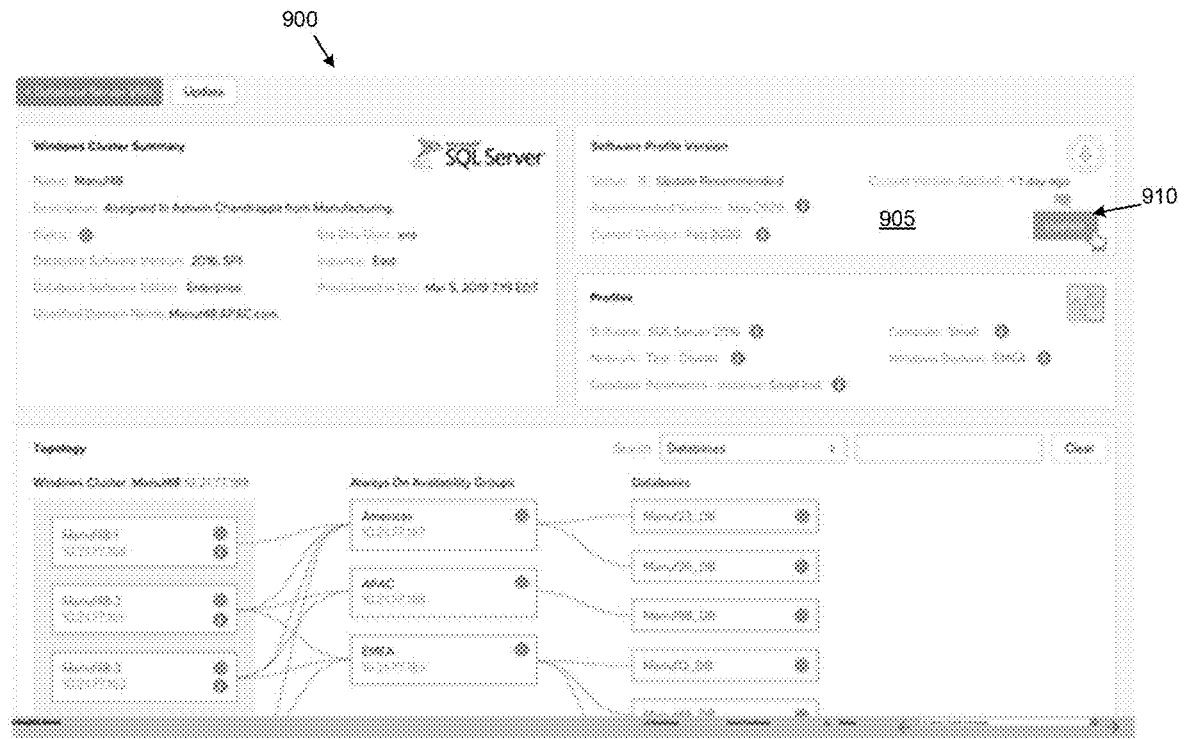
Figure 10:
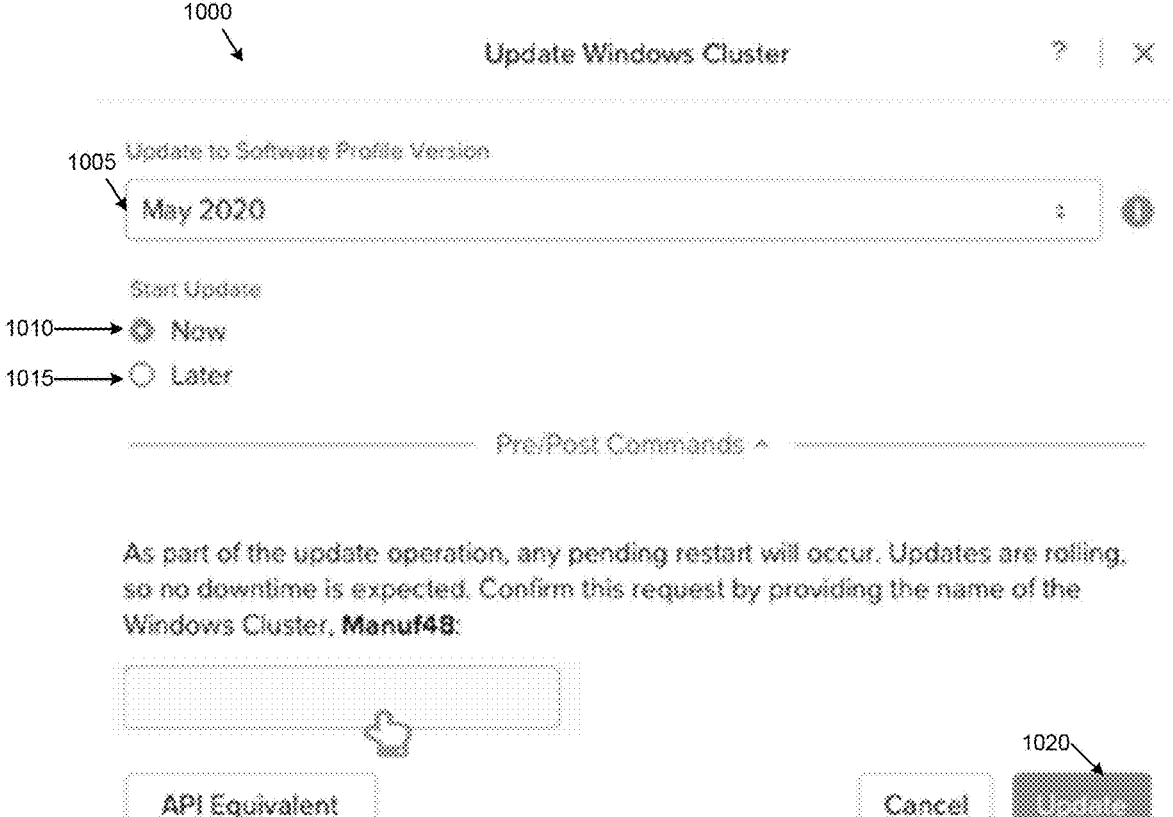

After creating the new version of the software profile, the user may navigate, via the dashboard 210, to a homepage 900 of an AG cluster, as shown in FIG. 9. The homepage 900 may show, among other information, software patching information in a software profile version box 905. If a new version of a software profile that is applicable to the AG cluster is available, that new version of the software profile may be shown in the software profile version box 905. If a new version of a software profile is available, the user may interact with (e.g., click on) an update button 910 to start the patching process on the AG cluster. Upon clicking the update button 910, the user may be presented with an update windows cluster dialog box 1000, as shown in FIG. 10.

Figure 11:
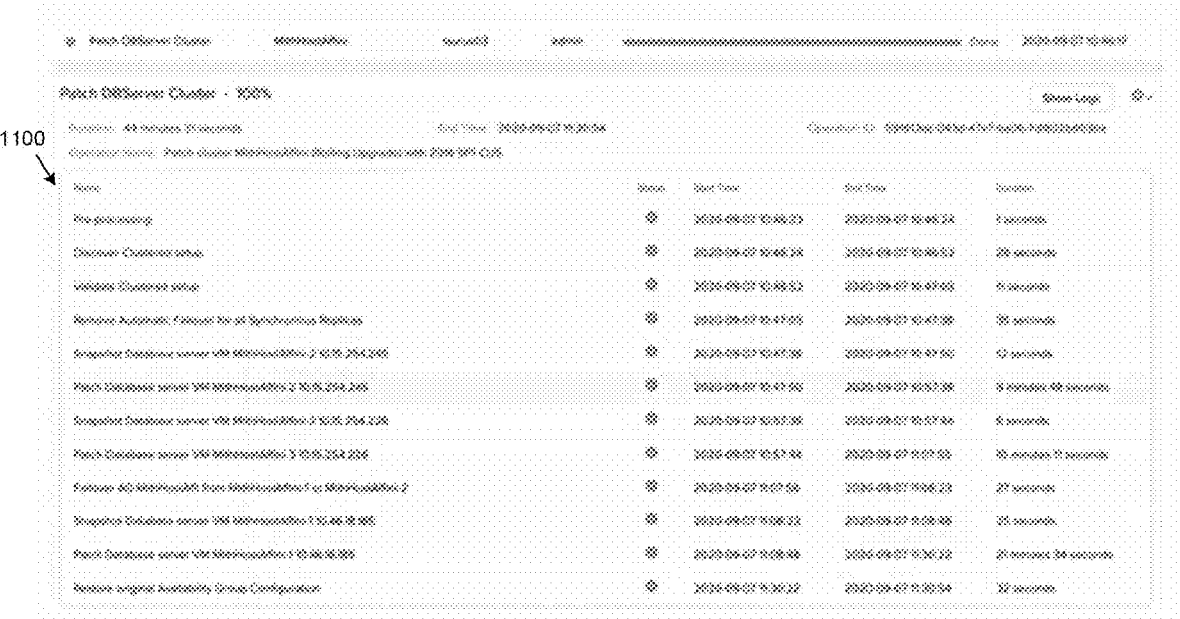

The user may use the update windows cluster dialog box 1000 to schedule the patching operation. Specifically, in some embodiments, the user may select a name 1005 of the new version of the software profile that is to be applied. The name 1005 may be same as the name 805. The user may also select whether to perform the patching operation right away by selecting a now button 1010 or at a future date by selecting a later button 1015. If the later button 1015 is selected, the user may be presented with options to select a future date and/or time at which to perform the patching operation. The user may interact with (e.g., click on) an update button 1020 to start the patching operation. Upon clicking on the update button 1020, the patching operation starts and a status display 1100 of FIG. 11 is opened. The status display 1100 shows the progress of the patching operation. The patching operation may be performed in accordance with FIGS. 2-6 above.

Thus, the present disclosure provides a mechanism to easily, quickly, and reliably perform a patching operation on an AG cluster using rolling patching while minimizing the downtime of the AG cluster. The patching may use a dynamic patching algorithm to intelligently decide the order in which the nodes of the AG cluster are to be patched, thereby at least increasing the performance of the database system 200.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:

receiving, by a processor executing computer-readable instructions stored on a memory, a request for patching a plurality of nodes, each of the plurality of nodes being part of an availability group that maintains coordinated replication of a database and metadata indicating a single primary and one or more secondary copies;

determining, by the processor, for each node of the plurality of nodes, whether the node is designated in the metadata as storing a primary copy or only secondary copies of the database;

assigning, by the processor, a first priority value to each of the plurality of nodes, the first priority value representing a dynamically determined patching order, wherein the first priority value is assigned such that the plurality of nodes that are configured for asynchronous replication within the availability group are selected for patching before the plurality of nodes that are configured for synchronous replication within the availability group;

selecting, by the processor, a node from the plurality of nodes for patching based on the first priority value;

determining, by the processor, whether the selected node stores the primary copy of the database of at least one availability group;

responsive to determining that the selected node stores the primary copy of the database of at least one availability group:

identifying, by the processor, a failover target node from the plurality of nodes based on a second priority value assigned to each of the plurality of nodes, the second priority value being independent of the first priority value and indicating failover preference, wherein the second priority value is assigned such that the plurality of nodes that are configured for synchronous replication within the availability group are selected as the failover target node before the plurality of nodes that are configured for asynchronous replication within the availability group; and patching, by the processor, the selected node upon failing over the selected node to the failover target node; or responsive to determining that the selected node does not store the primary copy of the database of any availability group, patching, by the processor, the selected node; and after each patching operation, dynamically recalculating and updating the first priority value of each of the plurality of nodes based on current cluster conditions.

2. The method of claim 1, wherein the plurality of nodes that are designated in the metadata as storing a primary copy are patched after the plurality of nodes that are designated in the metadata as storing only secondary copies.

3. The method of claim 1, wherein the first priority value is a positive integer value and the second priority value is a negative integer value.

4. The method of claim 1, wherein of the plurality of nodes that are configured for synchronous replication within the availability group, a healthy node is selected for patching before an unhealthy node, wherein node health is determined based on the current cluster conditions.

5. The method of claim 4, wherein of the plurality of nodes that are healthy and configured for the synchronous replication within the availability group, a remote node is selected for patching before a local node.

6. The method of claim 1, wherein the first priority value for each of the plurality of nodes that is designated in the metadata as storing a primary copy is computed based on a sum of a pre-determined integer value and a number of availability groups on the each of the plurality of nodes.

7. The method of claim 1, wherein the second priority value is assigned such that the plurality of nodes that are healthy and configured for synchronous replication within the availability group are selected as the failover target node before the plurality of nodes that are unhealthy and configured for synchronous replication within the availability group.

8. The method of claim 1, wherein the second priority value is assigned such that the plurality of nodes that are healthy are selected as the failover target node before the plurality of nodes that are unhealthy, wherein node health is determined based on the current cluster conditions.

9. The method of claim 1, wherein the second priority value is assigned such that the plurality of nodes that are healthy and already patched are selected as the failover target node before the plurality of nodes that are healthy and unpatched.

10. The method of claim 1, wherein the second priority value is assigned such that the plurality of nodes that are unhealthy and already patched are selected as the failover target node before the plurality of nodes that are unhealthy and unpatched.

11. The method of claim 1, wherein the patching of the plurality of nodes is performed using a software profile.

12. The method of claim 11, wherein for patching using the software profile, the method further comprises:

creating, by the processor, a new version of the software profile based on the patch;

cloning, by the processor, the new version of the software profile on the selected node or the next node that is being patched; and migrating, by the processor, old data from the node to the new version of the software profile.

13. The method of claim 1, further comprising dynamically recalculating and updating the first priority value of each of the plurality of nodes based on the current cluster conditions for the plurality of nodes.

14. The method of claim 13, wherein the current cluster conditions of each of the plurality of nodes are determined based on at least one of a workload on the each of the plurality of nodes, or errors or alerts on the each of the plurality of nodes.

15. A system comprising:

a memory having computer-readable instructions stored thereon; and a processor executing the computer-readable instructions to:

receive a request to patch a plurality of nodes, each of the plurality of nodes being part of an availability group that maintains coordinated replication of a database and metadata indicating a single primary and one or more secondary copies;

determine, for each node of the plurality of nodes, whether the node is designated in the metadata as storing a primary copy or only secondary copies of the database;

assign a first priority value to each of the plurality of nodes, the first priority value representing a dynamically determined patching order, wherein the first priority value is assigned such that the plurality of nodes that are configured for asynchronous replication within the availability group are selected for patching before the plurality of nodes that are configured for synchronous replication within the availability group;

determine whether the selected node stores the primary copy of the database of at least one availability group;

responsive to determining that the selected node stores the primary copy of the database of at least one availability group:

identify a failover target node from the plurality of nodes based on a second priority value assigned to each of the plurality of nodes, the second priority value being independent of the first priority value and indicating failover preference, wherein the second priority value is assigned such that the plurality of nodes that are configured for synchronous replication within the availability group are selected as the failover target node before the plurality of nodes that are configured for asynchronous replication within the availability group; and patch the selected node upon failing over the selected node to the failover target node; or responsive to determining that the selected node does not store the primary copy of the database of any availability group, patch the selected node; and after each patching operation, dynamically recalculating and updating the first priority value of each of the plurality of nodes based on current cluster conditions.

16. The system of claim 15, wherein the plurality of nodes that are designated in the metadata as storing a primary copy are patched after the plurality of nodes that are designated in the metadata as storing only secondary copies.

17. The system of claim 15, wherein the first priority value is a positive integer value and the second priority value is a negative integer value.

18. The system of claim 15, wherein of the plurality of nodes that are configured for synchronous replication within the availability group, a healthy node is selected to patch before an unhealthy node, wherein node health is determined based on the current cluster conditions.

19. The system of claim 18, wherein of the plurality of nodes that are healthy and configured for the synchronous replication within the availability group, a remote node is selected to patch before a local node.

20. The system of claim 15, wherein the first priority value for each of the plurality of nodes that is designated in the metadata as storing a primary copy is computed based on a sum of a pre-determined integer value and a number of availability groups on the each of the plurality of nodes.

21. The system of claim 15, wherein the second priority value is assigned such that the plurality of nodes that are healthy and configured for synchronous replication within the availability group are selected as the failover target node before the plurality of nodes that are unhealthy and configured for synchronous replication within the availability group.

22. The system of claim 15, wherein the second priority value is assigned such that the plurality of nodes that are healthy are selected as the failover target node before the plurality of nodes that are unhealthy, wherein node health is determined based on the current cluster conditions.

23. The system of claim 15, wherein the second priority value is assigned such that the plurality of nodes that are healthy and already patched are selected as the failover target node before the plurality of nodes that are healthy and unpatched.

24. The system of claim 15, wherein the second priority value is assigned such that the plurality of nodes that are unhealthy and already patched are selected as the failover target node before the plurality of nodes that are unhealthy and unpatched.

25. The system of claim 15, wherein the patching of the plurality of nodes is performed using a software profile.

26. The system of claim 25, wherein to patch using the software profile, the processor further executes computer-readable instructions to:

create a new version of the software profile based on the patch;

clone the new version of the software profile on the selected node or the next node that is being patched; and migrate old data from the node to the new version of the software profile.

27. The system of claim 15, wherein the processor further executes computer-readable instructions to dynamically recalculate and update the first priority value of each of the plurality of nodes based on the current cluster conditions for the plurality of nodes.

28. The system of claim 27, wherein the current cluster conditions of each of the plurality of nodes are determined based on at least one of a workload on the each of the plurality of nodes, or errors or alerts on the each of the plurality of nodes.

29. A non-transitory computer readable medium comprising computer-readable instructions stored thereon that when executed by a processor causes the processor to:

receive a request to patch a plurality of nodes, each of the plurality of nodes being part of an availability group that maintains coordinated replication of a database and metadata indicating a single primary and one or more secondary copies;

determine, for each node of the plurality of nodes, whether the node is designated in the metadata as storing a primary copy or only secondary copies of the database;

assign a first priority value to each of the plurality of nodes, the first priority value representing a dynamically determined patching order, wherein the first priority value is assigned such that the plurality of nodes that are configured for asynchronous replication within the availability group are selected for patching before the plurality of nodes that are configured for synchronous replication within the availability group;

select a node from the plurality of nodes to patch based on the first priority value;

determine whether the selected node stores the primary copy of the database of at least one availability group;

responsive to determining that the selected node stores the primary copy of the database of at least one availability group:

identify a failover target node from the plurality of nodes based on a second priority value assigned to each of the plurality of nodes, the second priority value being independent of the first priority value and indicating failover preference, wherein the second priority value is assigned such that the plurality of nodes that are configured for synchronous replication within the availability group are selected as the failover target node before the plurality of nodes that are configured for asynchronous replication within the availability group; and patch the selected node upon failing over the selected node to the failover target node; or responsive to determining that the selected node does not store the primary copy of the database of any availability group, patch the selected node; and after each patching operation, dynamically recalculating and updating the first priority value of each of the plurality of nodes based on current cluster conditions.

30. The non-transitory computer readable medium of claim 29, wherein the plurality of nodes that are designated in the metadata as storing a primary copy are patched after the plurality of nodes that are designated in the metadata as storing only secondary copies.

31. The non-transitory computer readable medium of claim 29, wherein the first priority value is a positive integer value and the second priority value is a negative integer value.

32. The non-transitory computer readable medium of claim 29, wherein of the plurality of nodes that are configured for synchronous replication within the availability group, a healthy node is selected to patch before an unhealthy node, wherein node health is determined based on the current cluster conditions.

33. The non-transitory computer readable medium of claim 29, wherein of the plurality of nodes that are healthy and configured for the synchronous replication within the availability group, a remote node is selected to patch before a local node.

34. The non-transitory computer readable medium of claim 29, wherein the first priority value for each of the plurality of nodes that is designated in the metadata as storing a primary copy is computed based on a sum of a pre-determined integer value and a number of availability groups on the each of the plurality of nodes.

35. The non-transitory computer readable medium of claim 29, wherein the second priority value is assigned such that the plurality of nodes that are healthy and configured for synchronous replication within the availability group are selected as the failover target node before the plurality of nodes that are unhealthy and configured for synchronous replication within the availability group.

36. The non-transitory computer readable medium of claim 29, wherein the second priority value is assigned such that the plurality of nodes that are healthy are selected as the failover target node before the plurality of nodes that are unhealthy, wherein node health is determined based on the current cluster conditions.

37. The non-transitory computer readable medium of claim 29, wherein the second priority value is assigned such that the plurality of nodes that are configured for synchronous replication within the availability group are selected as the failover target node before the plurality of nodes that are configured for asynchronous replication within the availability group.

38. The non-transitory computer readable medium of claim 29, wherein the second priority value is assigned such that the plurality of nodes that are healthy and already patched are selected as the failover target node before the plurality of nodes that are healthy and unpatched.

39. The non-transitory computer readable medium of claim 29, wherein the second priority value is assigned such that the plurality of nodes that are unhealthy and already patched are selected as the failover target node before the plurality of nodes that are unhealthy and unpatched.

40. The non-transitory computer readable medium of claim 29, wherein the patching of the plurality of nodes is performed using a software profile.

41. The non-transitory computer readable medium of claim 40, wherein to patch using the software profile, the processor further executes computer-readable instructions to:

create a new version of the software profile based on the patch;

clone the new version of the software profile on the selected node or the next node that is being patched; and migrate old data from the node to the new version of the software profile.

42. The non-transitory computer readable medium of claim 29, wherein the processor further executes computer-readable instructions to dynamically recalculate and update the first priority value of each of the plurality of nodes based on the current cluster conditions for the plurality of nodes.

43. The non-transitory computer readable medium of claim 42, wherein the current cluster conditions of each of the plurality of nodes are determined based on at least one of a workload on the each of the plurality of nodes, or errors or alerts on the each of the plurality of nodes.

* * * * *